United States Patent
Liu

(10) Patent No.: US 10,379,608 B2
(45) Date of Patent: Aug. 13, 2019

(54) ELECTRONIC APPARATUS WITH BUILT-IN NEAR-VISION DISPLAY SYSTEM AND DISPLAY METHOD USING BUILT-IN NEAR-VISION DISPLAY SYSTEM

(71) Applicant: Lenovo (Beijing) Co., Ltd., Beijing (CN)

(72) Inventor: Junfeng Liu, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/583,612

(22) Filed: Dec. 27, 2014

(65) Prior Publication Data
US 2016/0091969 A1   Mar. 31, 2016

(30) Foreign Application Priority Data

Sep. 28, 2014   (CN) .......................... 2014 1 0510566

(51) Int. Cl.
| | |
|---|---|
| *G06F 3/01* | (2006.01) |
| *G06F 1/16* | (2006.01) |
| *G09G 3/36* | (2006.01) |

(52) U.S. Cl.
CPC .............. *G06F 3/013* (2013.01); *G06F 1/163* (2013.01); *G06F 1/1637* (2013.01); *G06F 1/1647* (2013.01); *G09G 3/3622* (2013.01); *G09G 2300/06* (2013.01); *G09G 2310/0278* (2013.01)

(58) Field of Classification Search
CPC ................................. G06F 3/013; G06F 1/163
See application file for complete search history.

(56) References Cited

U.S. PATENT DOCUMENTS

| | | | | |
|---|---|---|---|---|
| 9,727,296 B2* | 8/2017 | Wan | ....................... | G06F 3/1423 |
| 9,753,518 B2* | 9/2017 | Zhou | ..................... | G06F 1/1637 |
| 9,886,111 B2* | 2/2018 | Wei | ........................ | G06F 3/041 |
| 9,934,573 B2* | 4/2018 | Reif | ....................... | G06F 3/013 |
| 9,959,794 B2* | 5/2018 | Li | .......................... | G09G 3/001 |
| 2003/0096648 A1* | 5/2003 | Ohno | ..................... | A63F 13/10 |
| | | | | 463/32 |

(Continued)

OTHER PUBLICATIONS

Office Action dated Apr. 15, 2015 from corresponding German Application No. DE 10 2014 019 605.4 (6 pages including English translation).

*Primary Examiner* — Nitin Patel
*Assistant Examiner* — Robert M Stone
(74) *Attorney, Agent, or Firm* — Brinks Gilson & Lione; John C. Freeman

(57) ABSTRACT

An electronic apparatus includes a main body, a fixing body, and a first display unit provided on the main body and/or the fixing body, wherein the first display unit has a first visible area and when the eyes of the viewer are a first distance away from the first visible area, a first image area of the image is perceived by the viewer, and when the eyes of the viewer are a second distance away from the first visible area, a second image area of the image is perceived by the viewer. The second image area includes the first image area and the first distance is larger than the second distance. A first content in the first image is displayed in the first image area, wherein the first content is perceived by the viewer when eyes of the viewer are the first distance away from the first visible area.

11 Claims, 36 Drawing Sheets

(56) References Cited

U.S. PATENT DOCUMENTS

| | | | | |
|---|---|---|---|---|
| 2003/0234797 | A1* | 12/2003 | Williams | G06F 1/1626 |
| | | | | 345/649 |
| 2005/0195154 | A1* | 9/2005 | Robbins | G06F 3/0481 |
| | | | | 345/156 |
| 2005/0197763 | A1* | 9/2005 | Robbins | G06F 3/0481 |
| | | | | 345/169 |
| 2009/0298546 | A1* | 12/2009 | Kim | G06F 1/1616 |
| | | | | 455/566 |
| 2011/0148931 | A1* | 6/2011 | Kim | G06F 3/011 |
| | | | | 345/660 |
| 2011/0310492 | A1 | 12/2011 | Takagi et al. | |
| 2013/0033485 | A1* | 2/2013 | Kollin | G06F 1/1637 |
| | | | | 345/419 |
| 2013/0128364 | A1* | 5/2013 | Wheeler | A61B 3/113 |
| | | | | 359/630 |
| 2013/0222270 | A1* | 8/2013 | Winkler | H04M 1/0233 |
| | | | | 345/173 |
| 2013/0235096 | A1* | 9/2013 | Liu | G09G 5/30 |
| | | | | 345/697 |
| 2013/0278800 | A1 | 10/2013 | Liu | |
| 2013/0342569 | A1* | 12/2013 | Karkkainen | G02B 27/017 |
| | | | | 345/633 |
| 2014/0333666 | A1* | 11/2014 | Poulos | G06T 19/006 |
| | | | | 345/633 |
| 2015/0193102 | A1* | 7/2015 | Lanier | G06F 3/017 |
| | | | | 715/746 |
| 2015/0277841 | A1* | 10/2015 | Lanier | G06F 3/014 |
| | | | | 345/428 |
| 2015/0378662 | A1* | 12/2015 | Wan | G06F 3/1423 |
| | | | | 345/156 |

* cited by examiner

ELECTRONIC APPARATUS WITH BUILT-IN NEAR-VISION DISPLAY SYSTEM AND DISPLAY METHOD USING BUILT-IN NEAR-VISION DISPLAY SYSTEM

This application claims priority to Chinese patent application No. 201410510566.9 filed on Sep. 28, 2014, the entire contents of which are incorporated herein by reference.

The present application relates to the field of electronic apparatus, and more particularly, to an electronic apparatus and a display method of a built-in near-vision display system.

BACKGROUND

At present, a wearable electronic apparatus like a smart watch is often equipped with only a conventional display, such as liquid crystal display (LCD), organic electroluminescent display, organic light emitting diode (OLED) display etc. Because of being restricted by size of the wearable electronic apparatus itself, like a smart watch, usually display area of the equipped conventional display is quite small, only limited information can be displayed.

It is therefore desirable to provide an electronic apparatus and a display method that can provide image or video display with larger size and higher resolution without being restricted by size of the wearable electronic apparatus itself, like a smart watch, and meanwhile adaptively provide content that the user desires to view when the viewer is at a different viewing distance, thereby enhance associated user experience.

SUMMARY

According to an embodiment of the present application, there is provided an electronic apparatus, comprising: a main body that comprises a processing unit configured to generate a first image and execute display control; a fixing body connected with the main body and configured to fix a position relationship relative to a viewer of the electronic apparatus; and a first display unit provided on the main body and/or the fixing body, and configured to output the first image, wherein the first display unit comprises a first display component configured to display the first image and a first light path converting component configured to perform light path conversion on the light corresponding to the first image as emitted from the first display component to thereby form an amplified virtual image corresponding to the first image, wherein the first display unit comprises a first visible area, when eyes of the viewer have a first distance away from the first visible area, a first image area of the image is perceived by the viewer, and when eyes of the viewer have a second distance away from the first visible area, a second image area of the image is perceived by the viewer, the second image area comprises the first image area, the first distance is larger than the second distance; a first content in the first image is displayed in the first image area, and the first content is perceived by the viewer when eyes of the viewer have the first distance away from the first visible area.

In addition, the electronic apparatus according to the embodiment of the present application further comprises further comprising a first sensor unit provided on the main body and/or the fixing body, and configured to sense a relative position parameter between eyes of the viewer and the first visible area, when the distance between eyes of the viewer and the first visible area maintains unchanged and the relative position parameter changes, the processing unit generates a first updated image comprising the first content and controls the first display unit to display the first updated image comprising the first content, wherein the first content still is perceived by the viewer.

In addition, in the electronic apparatus according to the embodiment of the present application wherein a second content in the first image is displayed in the second image area, wherein the second content is perceived by the viewer when eyes of the viewer have the second distance away from the first visible area, information quantity of the second content of the first image in second image area is larger than information quantity of the first content of the first image in the first image area.

In addition, the electronic apparatus according to the embodiment of the present application further comprises a second sensor unit provided on the main body and/or the fixing body, and configured to sense a parameter of distance between eyes of the viewer and the first visible area, when it is sensed that the distance changes from the first distance to the second distance, the processing unit generates a second image and controls the first display unit to display the second image, wherein a second content in the second image is displayed in the second image area, wherein the second content is perceived by the viewer when eyes of the viewer have the second distance away from the first visible area, information quantity of the second content of the second image in the second image area is larger than information quantity of the first content of the first image in the first image area.

In addition, in the electronic apparatus according to the embodiment of the present application, wherein the first distance is larger than a first distance threshold, and the second distance is smaller than the first distance threshold.

In addition, the electronic apparatus according to the embodiment of the present application further comprises a second sensor unit provided on the main body and/or the fixing body, and configured to sense a parameter of distance between eyes of the viewer and the first visible area, when it is sensed that the distance changes from the second distance to the first distance, the processing unit generates a third image and controls the first display unit to display the third image, a third image area of the image is perceived by the viewer the third image area comprises a portion of the first image located outside the third image area and within the second image area in the second distance, wherein the first content is perceived by the viewer when eyes of the viewer have the first distance away from the first visible area.

In addition, in the electronic apparatus according to the embodiment of the present application, wherein the fixing body comprises at least a fixed state in which the fixing body can serve as at least a portion of an annular space or an approximate annular space that satisfies a first predetermined condition, the annular space or the approximate annular space can surround periphery of a columnar body that satisfies a second predetermined condition.

In addition, the electronic apparatus according to the embodiment of the present application further comprises a second display unit configured to execute display of image and provided within the main body and/or the fixing body, wherein the first display unit and the second display unit are different types of display unit.

According to another embodiment of the present application, there is provided a display method applied to an electronic apparatus comprising a main body that comprises a processing unit configured to generate a first image and execute display control, a fixing body connected with the main body and configured to fix a position relationship relative to a user of the electronic apparatus, and a first display unit provided on the main body and/or the fixing body and configured to output the first image, wherein the first display unit comprises a first display component configured to display the first image and a first light path converting component configured to perform light path conversion on the light corresponding to the first image as emitted from the first display component to thereby form an amplified virtual image corresponding to the first image, the display method comprising: generating or acquiring a first image signal to be displayed; and executing display of the first image based on the first image signal, wherein the first display unit comprises a first visible area, when eyes of the viewer have a first distance away from the first visible area, a first image area of the image is perceived by the viewer, and when eyes of the viewer have a second distance away from the first visible area, a second image area of the image is perceived by the viewer, the second image area comprises the first image area, the first distance is larger than the second distance; a first content in the first image is displayed in the first image area, wherein the first content is perceived by the viewer when eyes of the viewer have the first distance away from the first visible area.

In addition, in the display method according to another embodiment of the present application, wherein the electronic apparatus further comprises a first sensor unit provided on the main body and/or the fixing body, and configured to sense a relative position parameter between eyes of the viewer and the first visible area, executing display of the first image based on the first image signal comprises: when the distance between eyes of the viewer and the first visible area maintains unchanged and the relative position parameter changes, generating a first updated image comprising the first content and controlling the first display unit to display the first updated image comprising the first content by the processing unit, wherein the first content still is perceived by the viewer.

In addition, in the display method according to another embodiment of the present application, wherein the electronic apparatus further comprises a second sensor unit provided on the main body and/or the fixing body and configured to sense a parameter of distance between eyes of the viewer and the first visible area, the display method further comprises: when it is sensed that the distance changes from the first distance to the second distance, generating a second image and controlling the first display unit to display the second image, wherein a second content in the second image is displayed in the second image area, wherein the second content is perceived by the viewer when eyes of the viewer have the second distance away from the first visible area, information quantity of the second content of the second image in the second image area is larger than information quantity of the first content of the first image in the first image area.

In addition, the display method according to another embodiment of the present application further comprises: when it is sensed that the distance changes from the second distance to the first distance, generates a third image and controlling the first display unit to display the third image by the processing unit, a third image area of the image is perceived by the viewer, the third image area comprises a portion of the first image located outside the third image area and within the second image area in the second distance, wherein the first content is perceived by the viewer when eyes of the viewer have the first distance away from the first visible area.

The electronic apparatus and the display method according to the embodiments of the present application can provide image or video display with larger size and higher resolution without being restricted by size of the wearable electronic apparatus itself, like a smart watch, and meanwhile adaptively provide content that the user desires to view when the viewer is at a different viewing distance, thereby enhance associated user experience.

It is to be understood that both the foregoing general descriptions and the following detailed descriptions are exemplary and intended to provide further explanation of the claimed technique.

DETAILED DESCRIPTION

Hereinafter, the embodiments of the present application will be described in detail with reference to the accompanying drawings.

First, an electronic apparatus according to an embodiment of the present application will be described with reference to FIGS. 1A to 1E. The electronic apparatus according to an embodiment of the present application may be a wearable electronic apparatus like a smart watch. Those skilled in the art will readily appreciate that, the electronic apparatus according to an embodiment of the present application is not limited thereto, instead, it may comprise any electronic apparatus having a display unit. For the sake of convenience of description, description is provided with the wearable electronic apparatus like a smart watch as example.

Figure 1A:
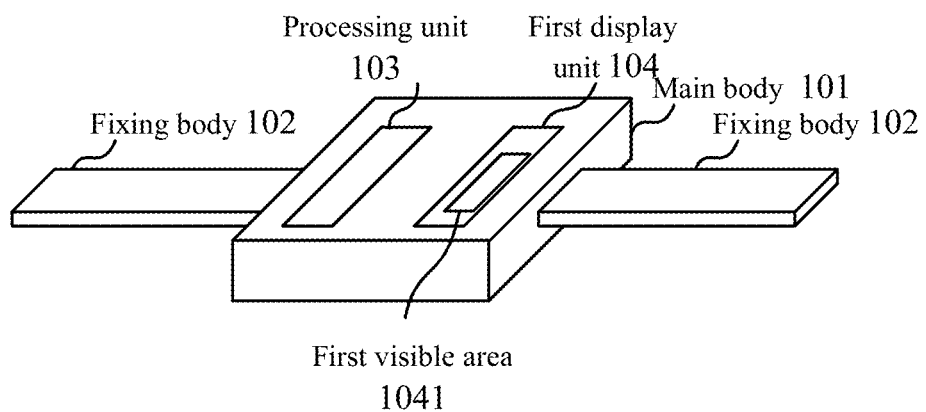
FIGS. 1A to 1E are structural block diagrams illustrating an electronic apparatus according to an embodiment of the present application.

FIGS. 1A to 1E are structural block diagrams illustrating an electronic apparatus according to an embodiment of the present application. As shown in FIG. 1A, an electronic apparatus 100 according to an embodiment of the present application comprises a main body 101 and a fixing body 102. The fixing body 102 is connected with the main body 101. The fixing body 102 comprises at least a fixed state in which the fixing body 102 can serve as at least a portion of an annular space or an approximate annular space that satisfies a first predetermined condition, the annular space or the approximate annular space can surround periphery of a columnar body that satisfies a second predetermined condition.

Figure 1B:
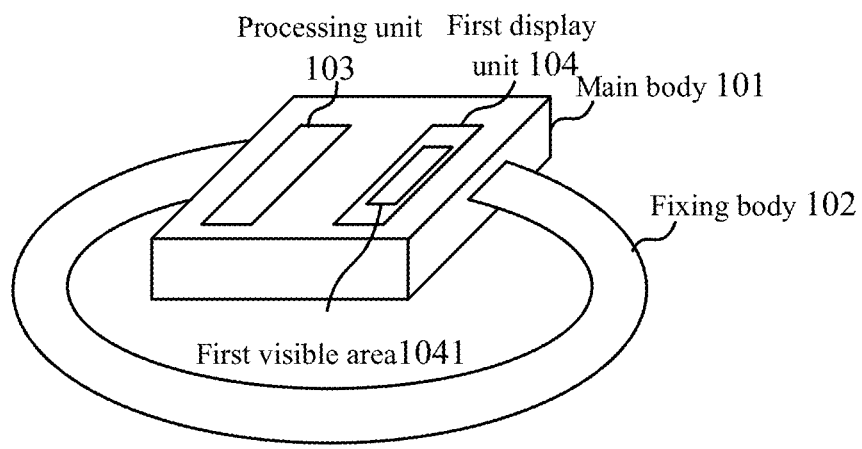
Figure 1C:
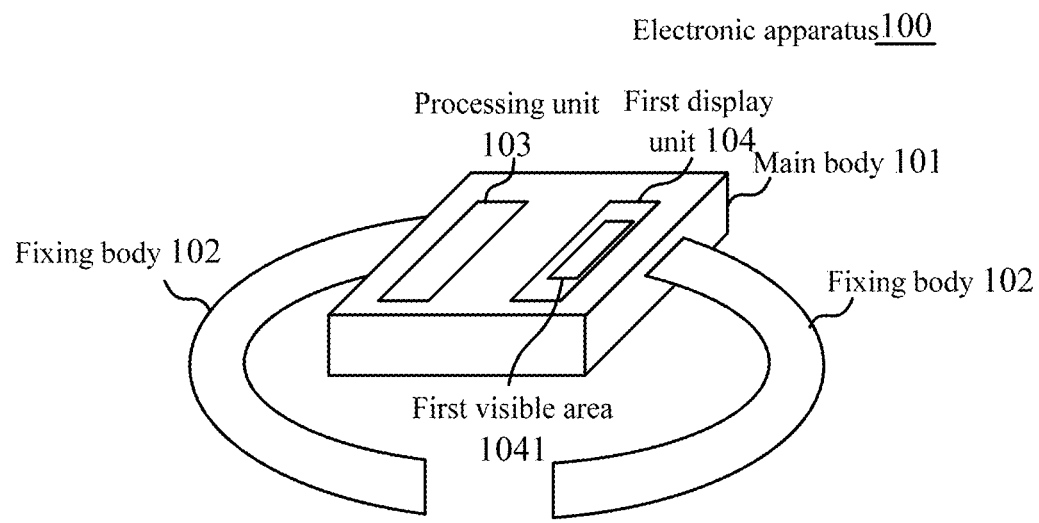

Specifically, FIGS. 1B and 1C respectively illustrate two fixed states that the fixing body 102 is connected with the main body 101. In a first fixed state as shown in FIG. 1B, the fixing body 102 and the main body 101 form a closed annular space, wherein the fixing body 102 and the main body 101 constitute a portion of the annular space, respectively. In a second fixed state as shown in FIG. 1C, the fixing body 102 and the main body 101 form an approximate annular space with a small opening, wherein the fixing body 102 and the main body 101 constitute a portion of the approximate annular space, respectively, a width of the small opening of the approximate annular space is less than a diameter of the columnar body. In an embodiment of the present application, the main body 101 is a dial portion of a smart watch, and the fixing body 102 is a strap portion of the smart watch. The annular space or the approximate annular space formed by the fixing body 102 and the main body 101 can surround the wrist of the user of the smart watch which serves as the columnar body, and a diameter of the annular space or the approximate annular space is greater than a diameter of the user's wrist and smaller than a diameter of the user's fist.

Figure 1D:
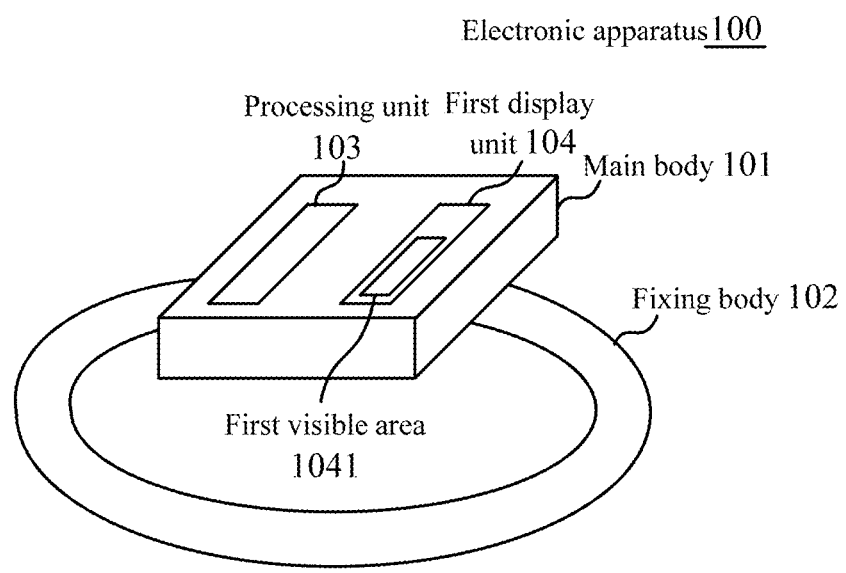
Figure 1E:
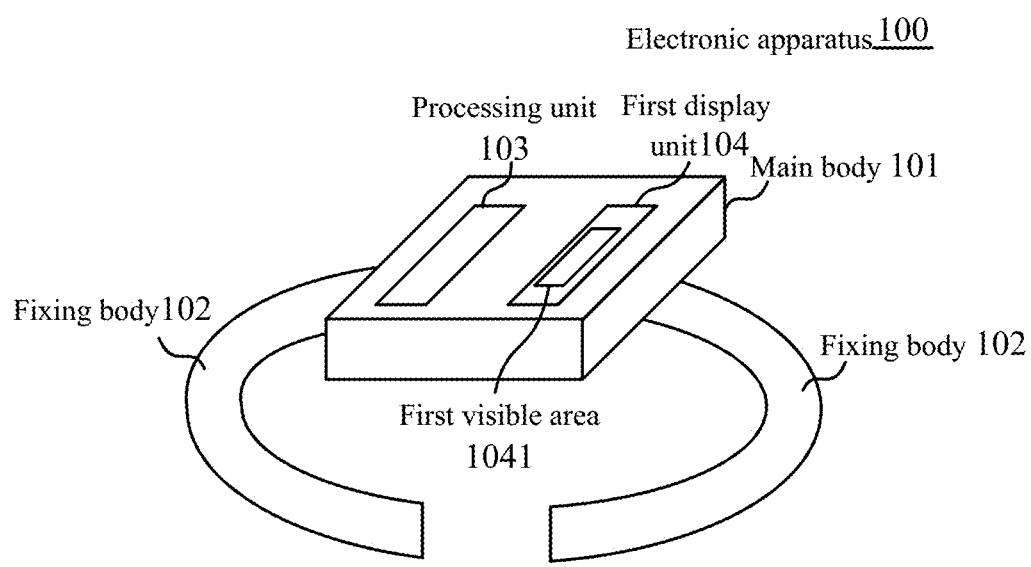

Further the annular space or the approximate annular space may be formed by the fixing body 102 alone. As shown in FIGS. 1D and 1E, the main body 101 may be provided on the fixing body 102 (i.e., the main body 101 is attached to the fixing body 102 in the manner of surface contact), wherein the fixing body 102 alone forms the annular space (FIG. 1D) or the approximate annular space (FIG. 1E) that surrounds the columnar body. The fixing body 102 is arranged with a fixing mechanism like hasps, snaps, zippers and so on (not shown).

Further, as shown in FIGS. 1A to 1E, a processing unit 103 and a first display unit 104 are arranged on the main body 101. The processing unit 103 is configured to generate a first image and execute display control. In the electronic apparatus 100 shown in FIGS. 1A to 1E, the first display unit 104 is arranged on the main body 101. However, as will be readily appreciated by those skilled in the art, the present application is not limited thereto, in another embodiment of the present application, the first display unit 104 may also be arranged on the fixing body 102. In yet another embodiment of the present application, the first display unit 104 may also be arranged on the main body 101 and the fixing body 102. For example, as will be further described in detail, the first display unit 104 will further comprise a light path converting component and a display component, the light path converting component may be provided partially on the main body 101 and partially on the fixing body 102; the display component may be provided on the main body 101 or the fixing body 102 as needed.

Further, as shown in FIGS. 1A to 1E, the first display unit 104 comprises a first visible area 1041, which is an area where an image content actually observed by the user is displayed.

Hereinafter, principles and implementations of the first display unit 104 will be described in detail with reference to FIGS. 2A to 2D and FIGS. 3A to 3C.

Figure 2A:
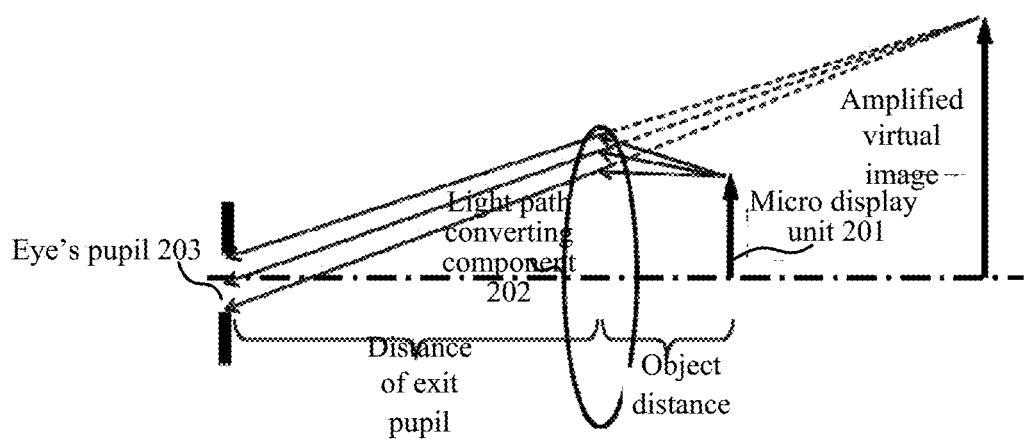
FIGS. 2A to 2D are schematic diagrams illustrating a near-vision optical display system adopted in the electronic apparatus according to an embodiment of the present application.

FIG. 2A is a schematic diagram illustrating a near-vision optical display system adopted in the electronic apparatus according to an embodiment of the present application. In the electronic apparatus according to a first embodiment of the present application, a near-vision optical display system is adopted as the first display unit 104. As shown in FIG. 2, light corresponding to the displayed image as emitted by a micro display unit 201 in the near-vision optical display system is received by a light path converting component 202 such as a lens group and the light path converting component 202 performs the corresponding light path conversion. As a result, light on which light path conversion has already been performed enters the viewer's pupil 203 to form a magnified virtual image.

Figure 2B:
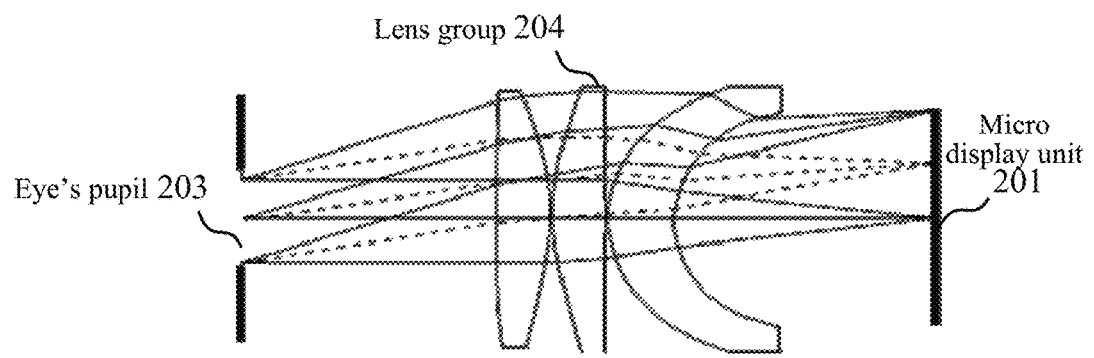
Figure 2C:
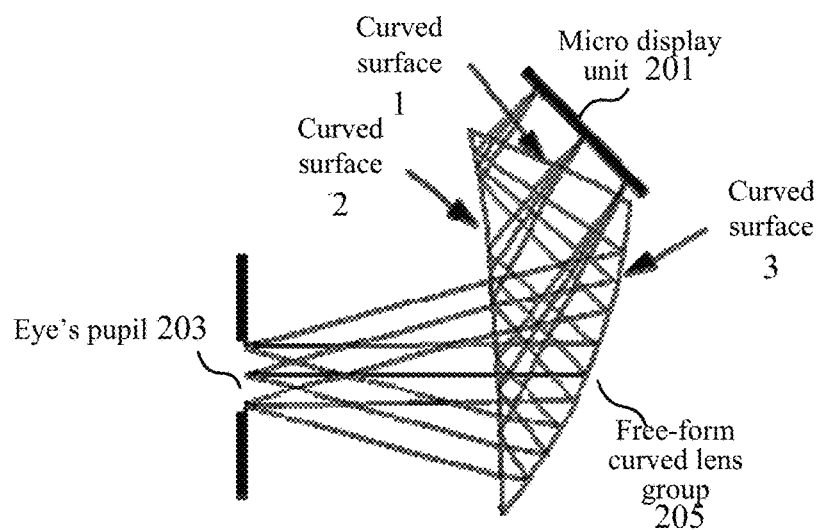
Figure 2D:
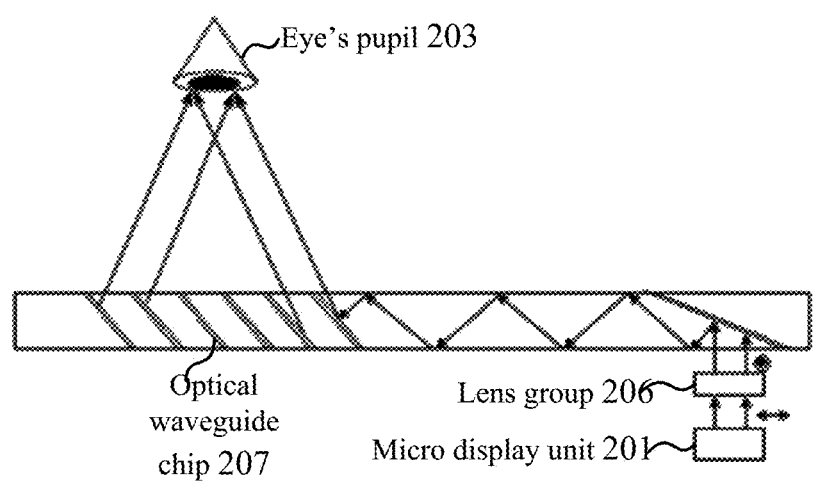

FIGS. 2B to 2D further illustrate three specific implementations based on the schematic diagram as shown in FIG. 2A. Specifically, the technical solution shown in FIG. 2B adopts a refractive-diffractive hybrid curved surface design, wherein the lens group 204 corresponds to the optical path converting component 202 shown in FIG. 2A, thereby the required lens volume is reduced. The technical solution shown in FIG. 2C adopts a free-form curved surface design, wherein a free-form curved lens group 205 comprising a curved surface 1, a curved surface 2, and a curved surface 3 corresponds to the optical path converting component 202 shown in FIG. 2A, thereby the required lens volume is reduced. The technical solution shown in FIG. 2D adopts a parallel plate design, which further comprises an optical waveguide chip 207, in addition to the lens group 206 corresponds to the optical path converting component 202 shown in FIG. 2A. By using the optical waveguide chip 207, in the case of reducing thickness of the required lens, control like translation is performed in the exit direction of the light that forms the amplified virtual image, (i.e., display direction of the magnified virtual image). As will be readily appreciated by those skilled in the art, the near-vision optical display system adopted in the electronic apparatus according to the first embodiment of the present application is not limited to what is shown in FIGS. 2B to 2D, other implementations like a projection eyepiece design may also be adopted instead.

Figure 3A:
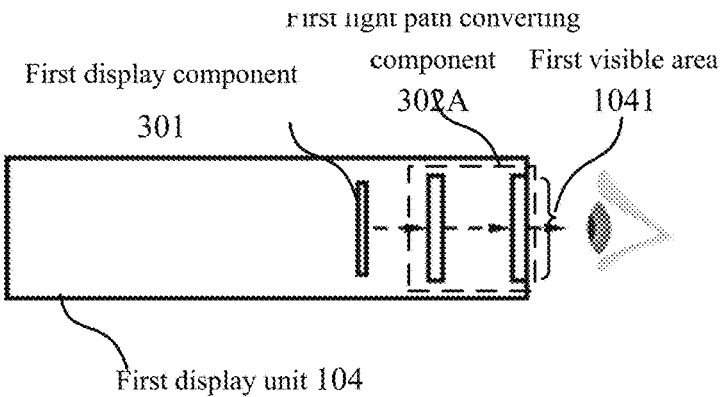
FIGS. 3A to 3C are schematic diagrams illustrating the first display unit in the electronic apparatus according to an embodiment of the present application.
Figure 3B:
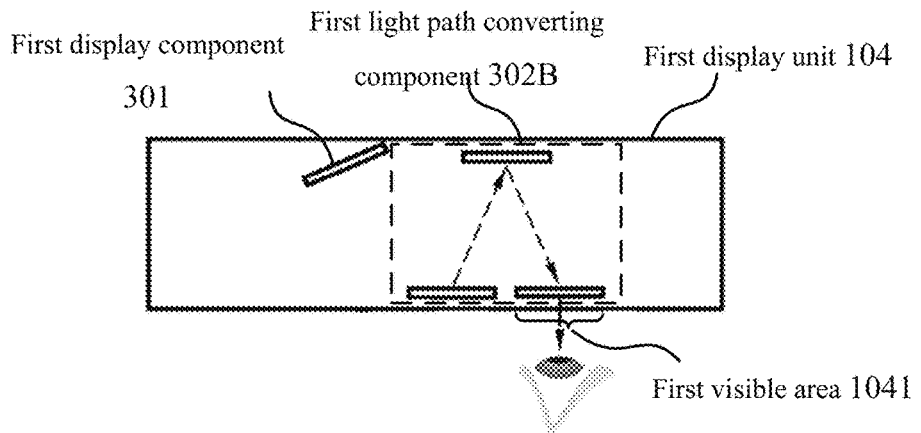
Figure 3C:
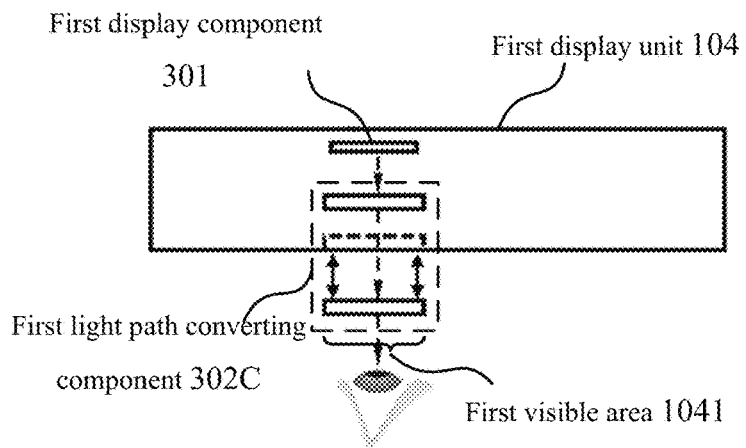

FIGS. 3A to 3C are schematic diagrams illustrating the first display unit in the electronic apparatus according to an embodiment of the present application. The first display unit 104 in the electronic apparatus 100 according to the first embodiment of the present application adopts the near-vision optical display system described above with reference to FIGS. 2A to 2D. The first display unit 104 comprises a first display component 301 configured to display the first image and a first light path converting component 302 (first light path converting component 302A to 302C in FIGS. 3A to 3C) configured to receive and perform light path conversion on the light corresponding to the first image as emitted from the first display component 301 to thereby form an amplified virtual image corresponding to the first image.

Specifically, in FIG. 3A, the first display component 301 may be a micro display, and the first light path converting component 302A is formed by a lens group. The lens group forms an amplified image corresponding to the first image displayed by the first display component 301.

In FIG. 3B, also, the first display component 301 may be a micro display, and the first light path converting component 302B is formed by optical devices that perform multiple reflections within the apparatus. In this case, as compared with the first light path converting component 302A as shown in FIG. 3A, space required by the first display unit 104 is saved, thereby facilitating design and manufacture of a more miniaturized electronic apparatus.

In FIG. 3C, also, the first display component 301 may be a micro display, and the first light path converting component 302C is formed by a zooming lens group that performs telescopic zooming under driving of a drive unit (not shown) within the apparatus. In this case, as compared with the first light path converting component 302A as shown in FIG. 3A, it is possible to dynamically adjust size of the amplified virtual image displayed by the first display unit 104 through zooming, thereby meeting different requirements of the user.

As shown in FIGS. 3A to 3C, the area where the image content of the first display unit 104 as actually observed by the user is displayed in the first visible area 1041 described with reference to FIGS. 1A to 1C.

Figure 4A:
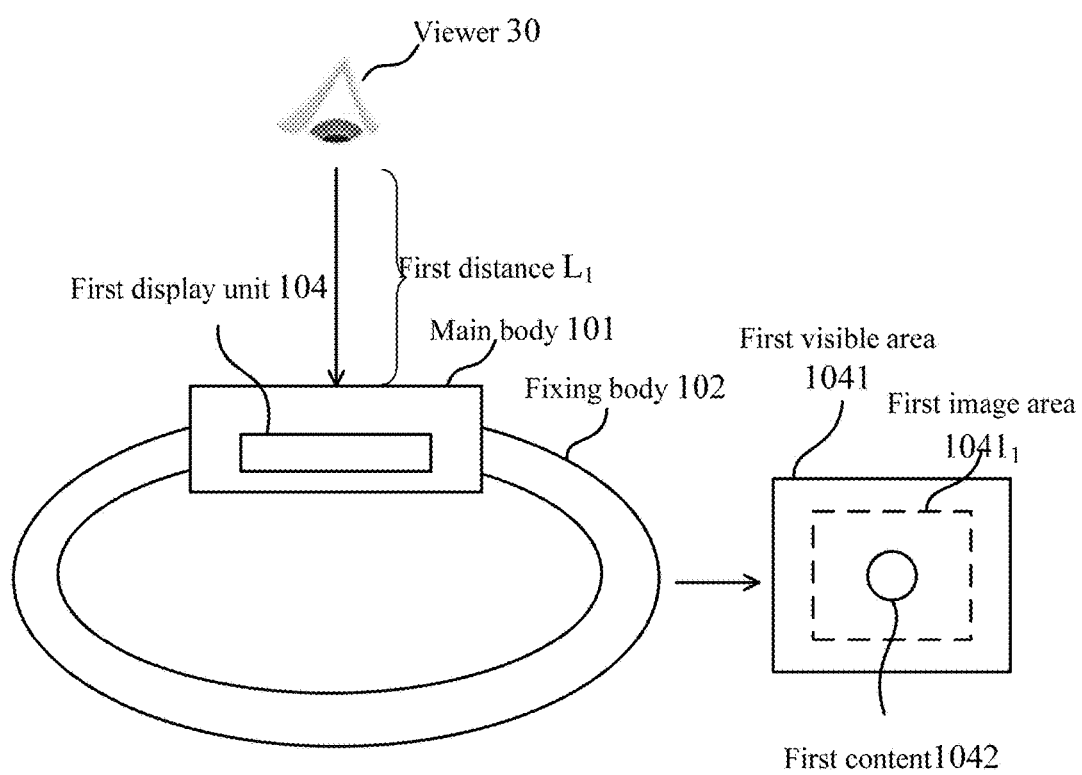
FIGS. 4A and 4B are schematic diagrams briefly illustrating the electronic apparatus according to an embodiment of the present application and its display states.
Figure 4B:
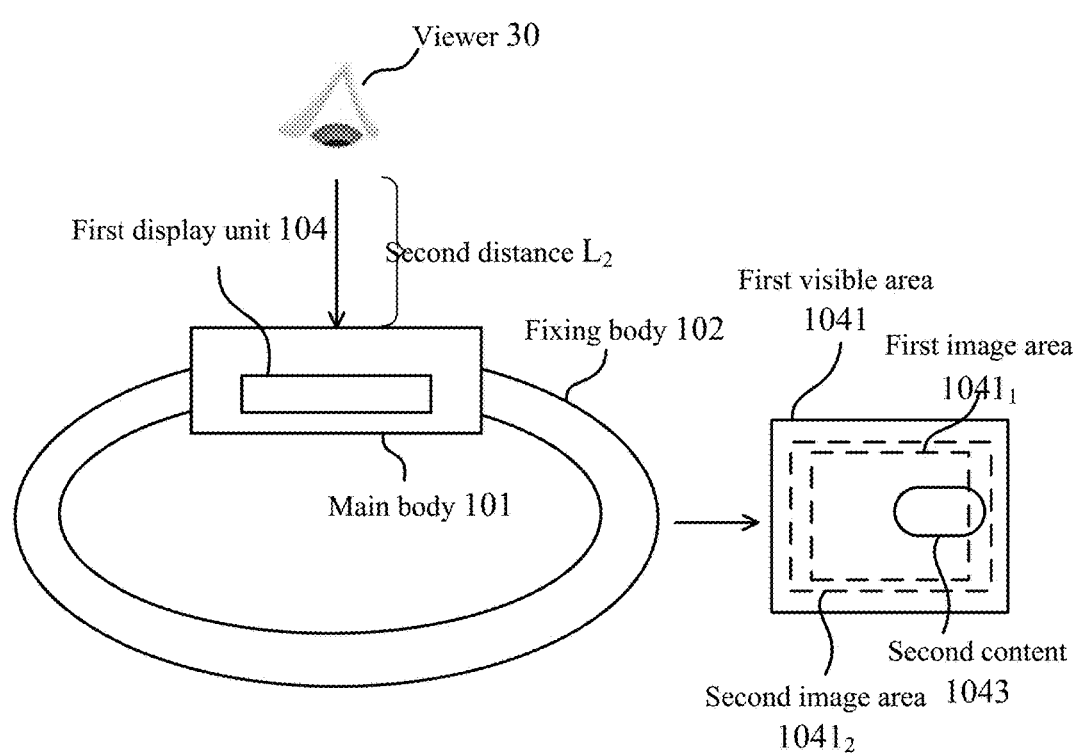

FIGS. 4A and 4B are schematic diagrams briefly illustrating the electronic apparatus according to an embodiment of the present application and its display states.

As shown in FIG. 4A, the first display unit 104 comprises a first visible area 1041, when eyes 30 of the viewer have a first distance L1 away from the first visible area 1041, a first image area 1041 of the image is perceived by the viewer. In this case, a first content 1042 in the first image as displayed by the first display unit 104 is displayed in the first image area $1041_1$, wherein the first content 1042 of the first image is perceived by the viewer when eyes 30 of the viewer have the first distance L1 away from the first visible area 1041.

As shown in FIG. 4B, when eyes 30 of the viewer have a second distance L2 away from the first visible area 1041, a second image area $1041_2$ of the image is perceived by the viewer, the second image area $1041_2$ comprises the first image area $1041_1$, the first distance L1 is larger than the second distance L2. In this case, a second content 1043 in the first image is displayed in the second image area $1041_2$, wherein the second content 1043 is perceived by the viewer when eyes 30 of the viewer have the second distance L2 away from the first visible area, information quantity of the second content 1043 of the first image in second image area $1041_2$ is larger than information quantity of the first content 1042 of the first image in the first image area $1041_1$.

In the example briefly illustrated in FIGS. 4A and 4B, as the viewer's eyes 30 gradually approach the first visual area 1041, the image area that is perceived by the viewer expands, and in the case that the display image output by the first display unit 104 maintains unchanged, information quantity of content that is perceived in the image area also increases.

The electronic apparatus and the display method according to the embodiment of the present application can further adaptively adjust the display of the image according to using state of the viewer, so as to ensure that the user can perceive the content that he/she desires to view.

Figure 5A:
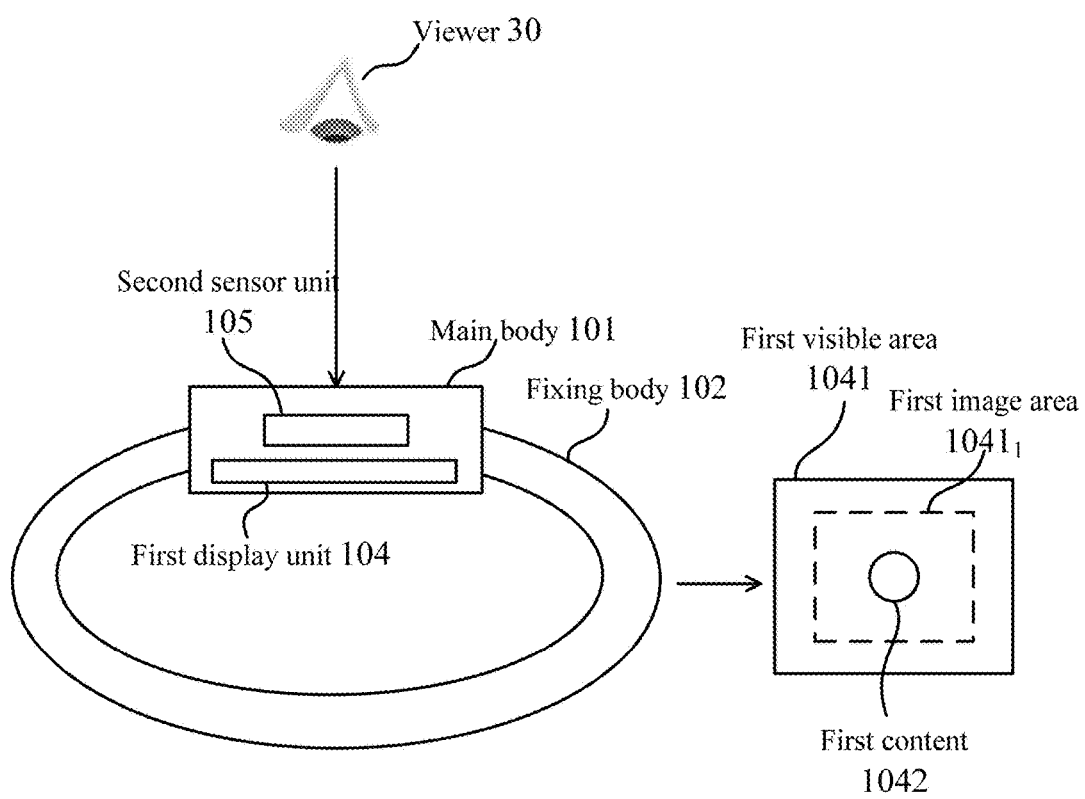
FIGS. 5A to 5C are schematic diagrams further specifically illustrating a first example of the electronic apparatus according to an embodiment of the present application and its display states.
Figure 5B:
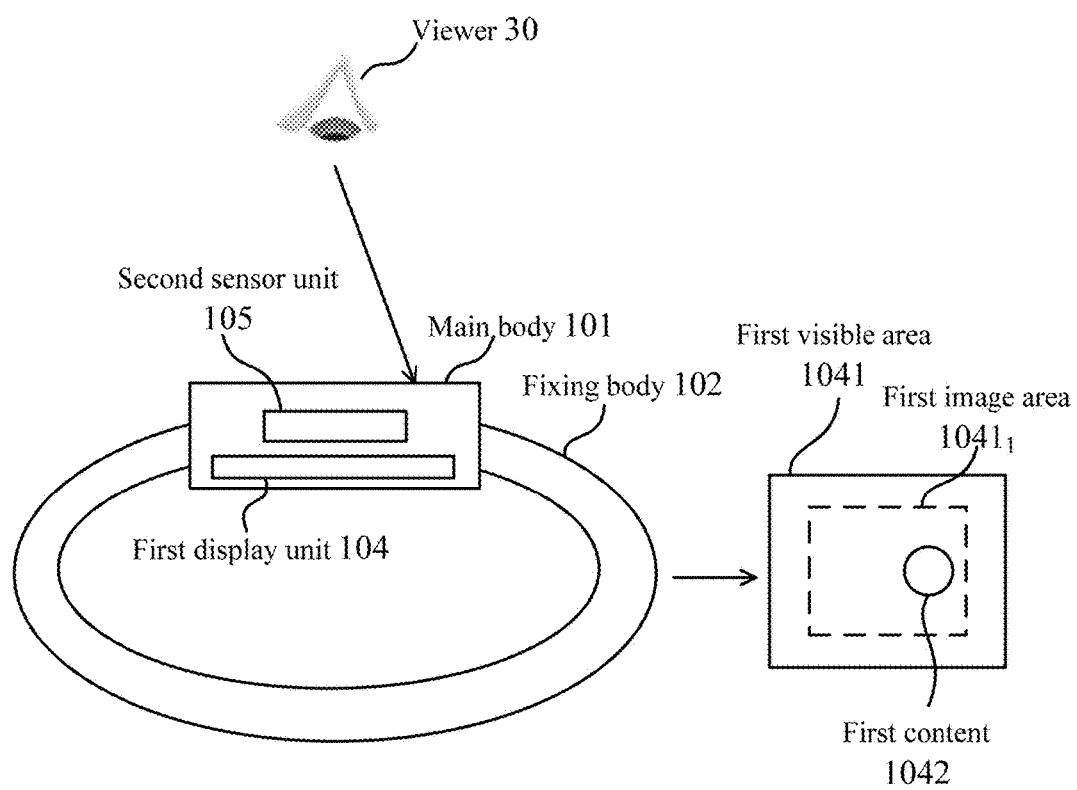
Figure 5C:
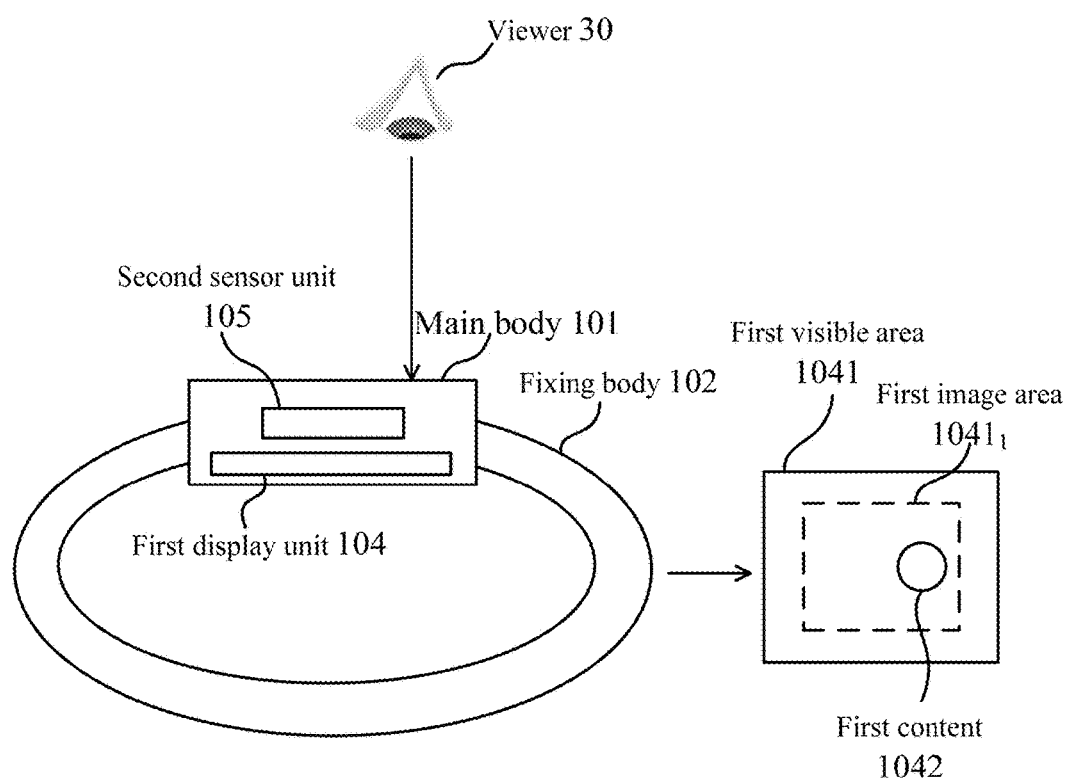

FIGS. 5A to 5C are schematic diagrams further specifically illustrating a first example of the electronic apparatus according to an embodiment of the present application and its display states.

As shown in FIGS. 5A to 5C, the electronic apparatus according to an embodiment of the present application is further configured with a first sensor unit 105 provided on the main body 101 and/or the fixing body 102, and configured to sense a relative position parameter between eyes 30 of the viewer and the first visible area 1041. In the embodiment of the present application, the relative position parameter comprises, but not limited to, parameters such as distance, direction etc.

FIG. 5A shows the state the same as that in FIG. 4A, that is, when eyes 30 of the viewer have a first distance L1 away from the first visible area 1041, a first image area $1041_1$ of the image is perceived by the viewer. In this case, a first content 1042 in the first image as displayed by the first display unit 104 is displayed in the first image area $1041_1$, wherein the first content 1042 of the first image is perceived by the viewer when eyes 30 of the viewer have the first distance L1 away from the first visible area 1041.

In FIGS. 5B and 5C, the first sensor unit 105 senses a change of the relative position parameter between eyes of the viewer 30 and the first visible area 1041, wherein when the distance between eyes of the viewer 30 and the first visible area 1041 maintains unchanged and the relative position parameter changes, the processing unit 103 generates a first updated image comprising the first content 1042 and controls the first display unit 104 to display the first updated image comprising the first content 1042, wherein the first content 1042 still is perceived by the viewer. In an embodiment of the present application, the first content 1042 is the content the user always desires to view when using the electronic apparatus. That is, the first content 1042 has a higher viewing priority relative to other contents in the first image displayed by the first display unit 104. For example, the first content 1042 may comprise, but not limited to, time, notification, weather forecast, memo and other contents.

Specifically, as shown in FIG. 5B, eyes 30 of the viewer do not move relative to the first visible area 1041, the first sensor unit 105 senses a change of a viewing direction that eyes 30 of the viewer view the first visible area 1041. In the example shown in FIG. 5B, the direction that eyes 30 of the viewer view the first visible area 1041 changes from viewing the center of the first visible area 1041 to viewing the right side of the first visible area 1041. In response to this, the processing unit 103 generates a first updated image comprising the first content 1042 and controls the first display unit 104 to display the first updated image comprising the first content 1042 correspondingly in the right side of the first visible area 1041, so as to be perceived by eyes 30 of the viewer.

Further, as shown in FIG. 5C, the first sensor unit 105 senses that eyes 30 of the viewer have a translation relative to the first visible area 1041. In the example shown in FIG. 5C, eyes 30 of the viewer have a rightward translation relative to the first visible area 1041. In response to this, the processing unit 103 generates a first updated image comprising the first content 1042 and controls the first display unit 104 to display the first updated image comprising the first content 1042 correspondingly in the right side of the first visible area 1041, so as to be perceived by eyes 30 of the viewer. As such, a visible area that is large enough is provided for the user with only a single first display unit being configured, and updatable display image is provided adaptively according to the relative position relationship between eyes of the viewer and the visible area, it is ensured that content with a higher viewing priority content is always perceived by the viewer. Compared with the configuration of two or more display units, a flexible display scheme is achieved at a lower cost.

Figure 6:
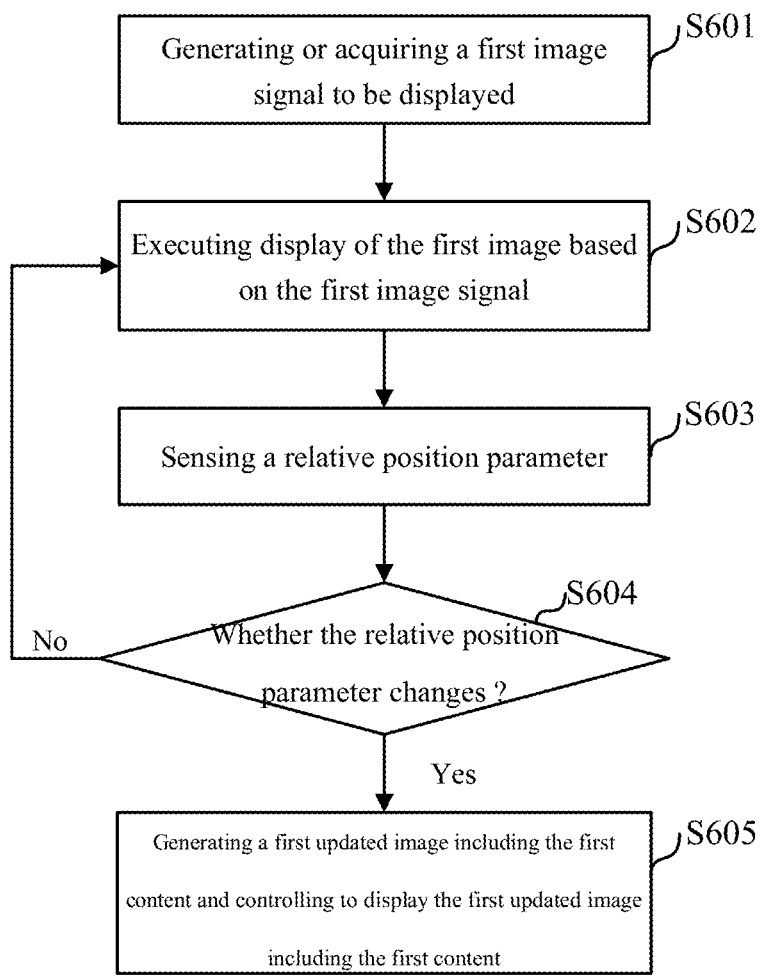
FIG. 6 is a diagram illustrating a first flow of the display method according to an embodiment of the present application corresponding to the first example.

FIG. 6 is a diagram illustrating a first flow of the display method according to an embodiment of the present application corresponding to the first example. As shown in FIG. 6, the first flow of the display method according to an embodiment of the present application comprises the following steps.

In step S601, the processing unit 103 generates or acquires a first image signal to be displayed. Thereafter, the processing proceeds to step S602.

In step S602, the first display unit 104 executes display of the first image based on the first image signal. Thereafter, the processing proceeds to step S603.

In step S603, the first sensor unit 105 senses a relative position parameter between eyes 30 of the viewer and the first visible area 1041. Thereafter, the processing proceeds to step S604.

In step S604, it is determined whether it is sensed relative position parameter changes.

If a positive result is obtained in step S604, that is, the sensed relative position parameter changes, then, the processing proceeds to step S605.

In step S605, the processing unit 103 generates a first updated image comprising the first content 1042 and controls the first display unit 104 to display the first updated image comprising the first content 1042. As shown in the above with reference to FIGS. 5B and 5C, when the distance between eyes 30 of the viewer and the first visible area 1041 maintains unchanged, no matter the viewing direction that eyes 30 of the viewer view the first visible area 1041 changes, or eyes 30 of the viewer have a translation relative to the first visible area 1041, both can make the first content 1042 in the first updated image be perceived by the eyes 30 of the viewer:

In contrast, if a negative result is obtained in step S604, the sensed relative position parameter does not change, then the processing returns to step S602.

Figure 7A:
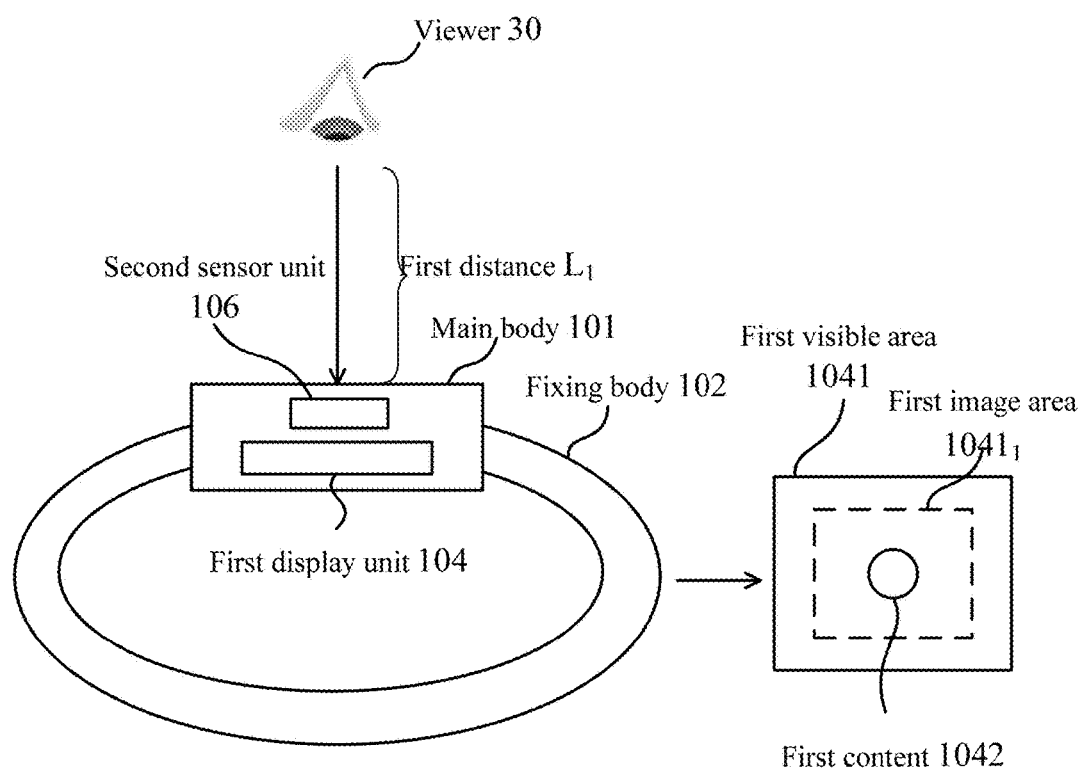
FIGS. 7A to 7C are schematic diagrams further illustrating a second example of the electronic apparatus according to an embodiment of the present application and its display states.
Figure 7B:
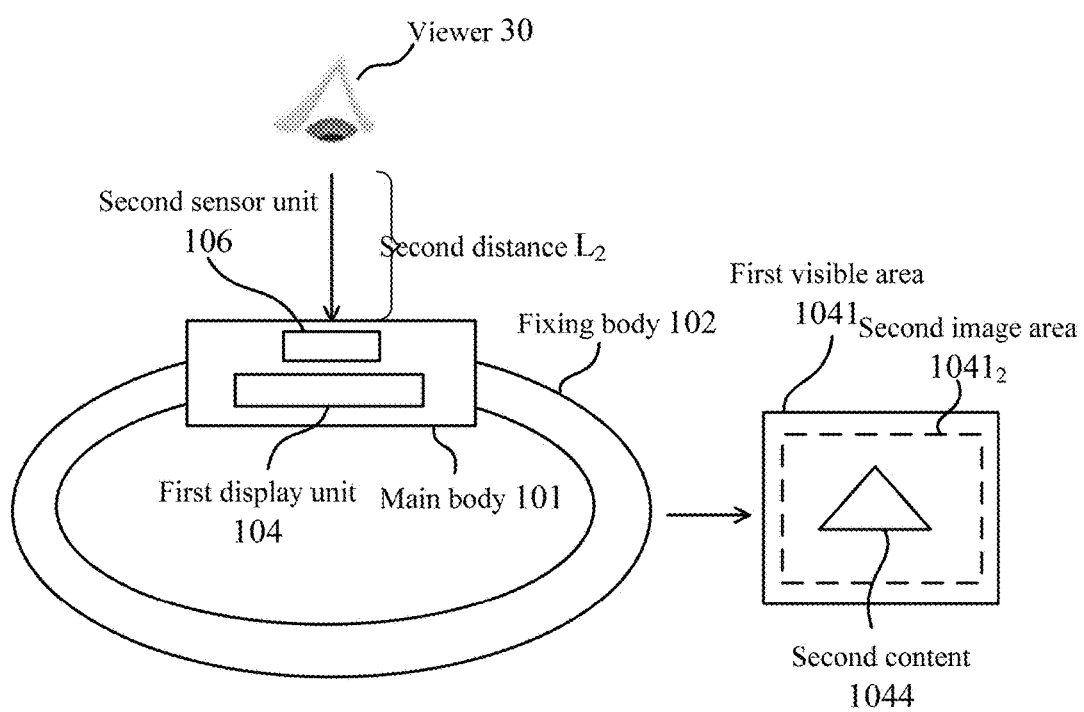
Figure 7C:
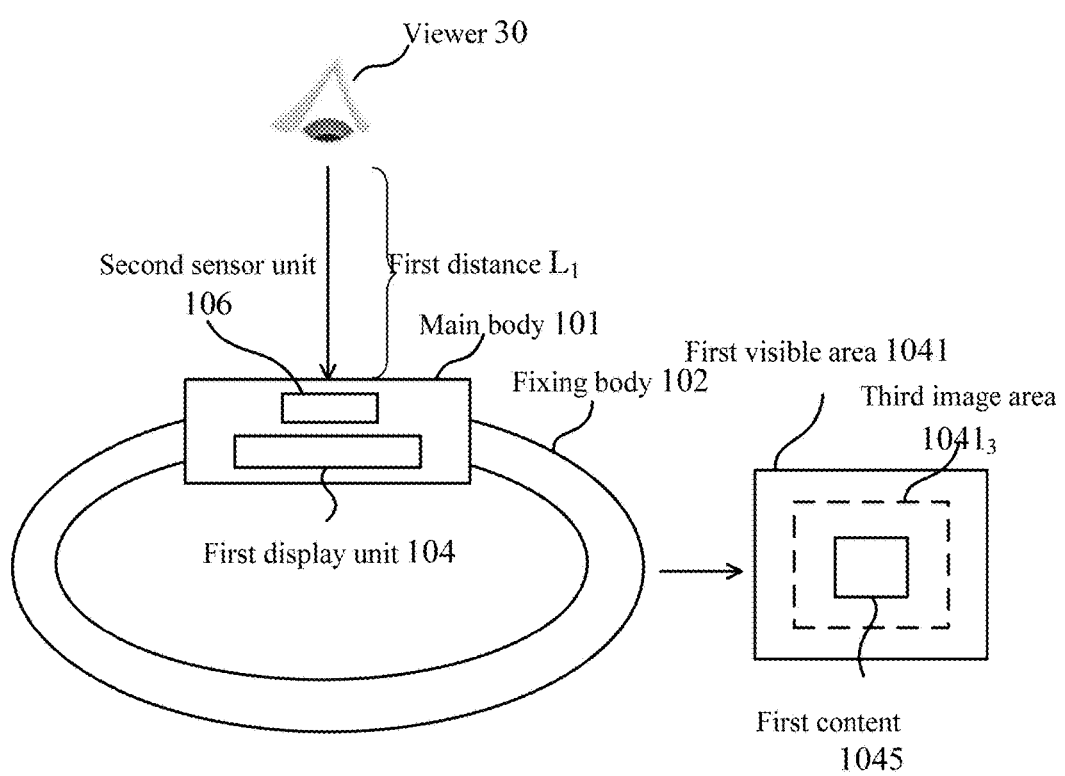

FIGS. 7A to 7C are schematic diagrams further illustrating a second example of the electronic apparatus according to an embodiment of the present application and its display states.

As shown in FIGS. 7A to 7C, the electronic apparatus according to an embodiment of the present application is further configured with a second sensor unit 106 provided on the main body 101 and/or the fixing body 102, and configured to sense a parameter of distance between eyes 30 of the viewer and the first visible area 1041. In the embodiment of the present application, the second sensor unit 106 may adopt ranging manners like infrared ranging, luminance ranging, and the measured distance parameter is converted into an actual distance between eyes 30 of the viewer and the first visible area 1041.

FIG. 7A shows the state the same as that in FIGS. 4A and 5A, that is, when eyes 30 of the viewer have a first distance L1 away from the first visible area 1041, a first image area $1041_1$ of the image is perceived by the viewer: In this case, a first content 1042 in the first image as displayed by the first display unit 104 is displayed in the first image area $1041_1$, wherein the first content 1042 of the first image is perceived by the viewer when eyes 30 of the viewer have the first distance L1 away from the first visible area 1041.

In FIG. 7B, when the second sensor unit 106 senses that the distance changes from the first distance L1 as shown in FIG. 7A to the second distance L2, the processing unit 103 generates a second image and controls the first display unit 104 to display the second image, wherein a second content 1044 in the second image is displayed in the second image area $1041_2$, wherein the second content 1044 is perceived by the viewer when eyes 30 of the viewer have the second distance L2 away from the first visible area 1041. As shown in FIG. 7B, information quantity of the second content 1044 of the second image in the second image area $1041_2$ is larger than information quantity of the first convent 1042 the first image in the first image area $1041_2$.

In FIG. 7C, when the second sensor unit 106 senses that the distance further changes from the second distance L2 as shown in FIG. 7B to the first distance L1, the processing unit 103 generates a third image and controls the first display unit 104 to display the third image, a third image area $1041_3$ of the image is perceived by the viewer, the third image area $1041_3$ comprises a portion of the first image located outside the third image area $1041_3$ and within the second image area $1041_2$ in the second distance L2, wherein the first content 1045 is perceived by the viewer when eyes 30 of the viewer have the first distance L1 away from the first visible area 1041.

As described above, in the cases shown in FIGS. 4A and 4B, the display image output by the first display unit 104 maintains unchanged as the distance between eyes 30 of the viewer and the first visible area 1041 changes. Different than that, in the second example shown in FIGS. 7A to 7C, the display image output by the first display unit 104 changes correspondingly as the distance between eyes 30 of the viewer and the first visible area 1041 changes. Further, in the case that the output display image changes, it is still kept that the eyes 30 of the viewer can perceive the first content having a higher viewing priority. For example, when the distance further changes from the second distance L2 as shown in FIG. 7B to the first distance L1 as shown in FIG. 7C, the third image area $1041_3$ that is perceived by the user is smaller than the second image area $1041_2$ that is perceived by the user in the second distance L2. Therefore, in the third image generated as the distance changes, a portion of the first content located outside the third image area $1041_3$ is gathered in the third image area $1041_3$, wherein eyes 30 of the viewer can perceive all of the first content without omission when eyes 30 of the viewer have the first distance L1 away from the first visible area 1041. In the second example shown in FIGS. 7A to 7C, the first distance L1 is larger than a first distance threshold, and the second distance L2 is smaller than the first distance threshold.

Figure 8:
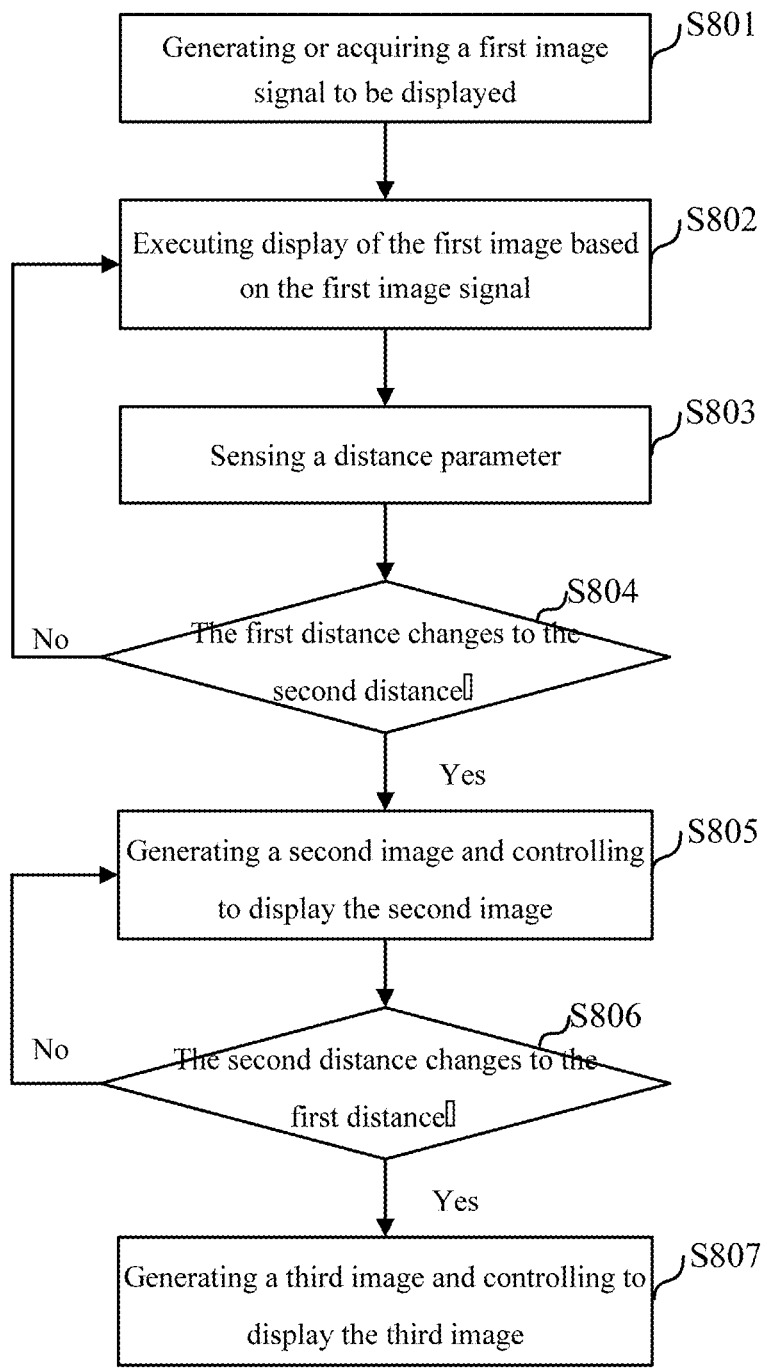
FIG. 8 is a diagram illustrating a second flow of the display method according to an embodiment of the present application corresponding to the second example.

FIG. 8 is a diagram illustrating a second flow of the display method according to an embodiment of the present application corresponding to the second example. As shown in FIG. 8, the second flow of the display method according to an embodiment of the present application comprises the following steps.

In step S801, the processing unit 103 generates or acquires a first image signal to be displayed. Thereafter, the processing proceeds to step S802.

In step S802, the first display unit 104 executes display of the first image based on the first image signal. Thereafter, the processing proceeds to step S803.

In step S803, the second sensor unit 106 senses a parameter of distance between eyes 30 of the viewer and the first visible area 1041. Thereafter, the processing proceeds to step S804.

In step S804, it is determined whether it is sensed distance changes from the first distance L1 to the second distance L2.

If a positive result is obtained in step S804, that is, it is sensed that the distance changes from the first distance L1 to the second distance L2, then, the processing proceeds to step S805.

In step S805, the processing unit 103 generates a second image and controls the first display unit 104 to display the second image. As shown in the above with reference to FIG. 7B, wherein a second content 1044 in the second image is displayed in the second image area $1041_2$, wherein the second content 1044 is perceived by the viewer when eyes 30 of the viewer have the second distance L2 away from the first visible area 1041. Information quantity of the second content 1044 of the second image in the second image area $1041_2$ is larger than information quantity of the first convent 1042 the first image in the first image area $1041_2$.

In contrast, if a negative result is obtained in step S804, i.e., no distance change is sensed, then the processing returns to step S802.

After step S805, the processing proceeds to step S806.

In step S806, it is further determined whether it is sensed distance changes from the second distance L2 to the first distance L1.

If a positive result is obtained in step S806, i.e., it is sensed that the distance changes from the second distance L2 to the first distance L1, then the processing proceeds to step S807.

In step S807, the processing unit 103 generates a third image and controls the first display unit 104 to display the third image, a third image area $1041_3$ of the image is perceived by the viewer, the third image area $1041_3$ comprises a portion of the first image located outside the third image area $1041_3$ and within the second image area $1041_2$ in the second distance L2, wherein the first content 1045 is perceived by the viewer when eyes 30 of the viewer have the first distance L1 away from the first visible area 1041.

In contrast, if a negative result is obtained in step S806, i.e., no further distance change is sensed, then the processing returns to step S805.

Hereinafter, the first display unit in the electronic apparatus according to an embodiment of the present application will be further described in detail with reference to FIGS. 9 to 15.

Figure 9:
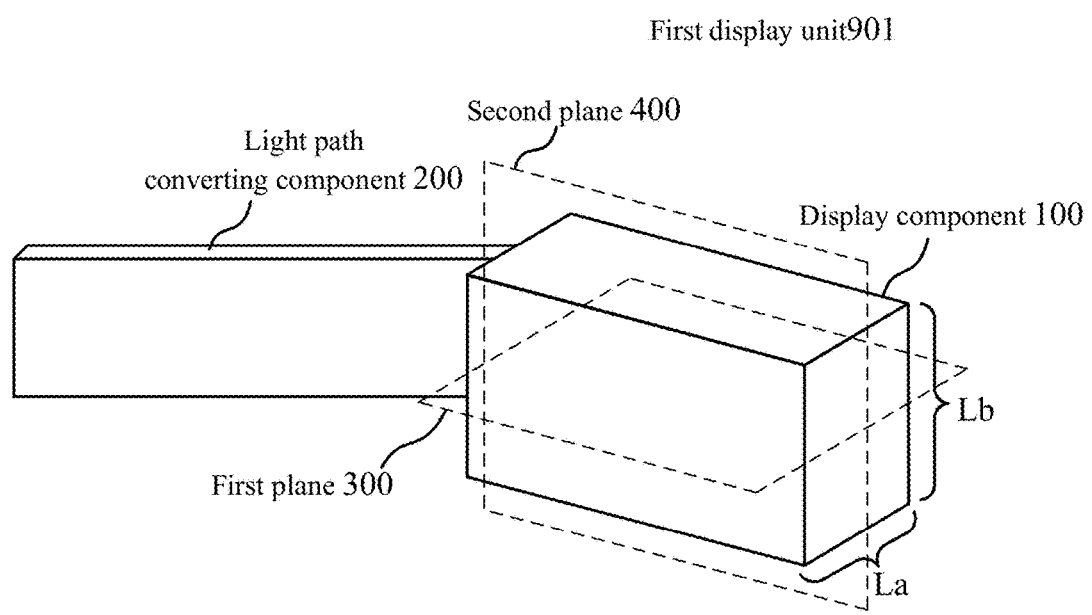
FIG. 9 is a structural block diagram illustrating a first example of the first display unit according to an embodiment of the present application.

FIG. 9 is a structural block diagram illustrating a first example of the first display unit according to an embodiment of the present application. FIG. 9 only illustrates the first display unit 901 comprising the display component 100 and the light path converting component 200, for simplicity of the illustration, internal configurations of the display component 100 and the light path converting component 200 as well as the light path are not shown in FIG. 9.

As illustrated in FIG. 9, light that forms the first image in the display component 100 is on a first plane 300, light that forms the virtual image corresponding to the first image and exits from the light path converting component 200 is on a second plane 400, there is a first angle between the first plane 300 and the second plane 400. In an embodiment of the present application, the first angle is 90 degrees. In this case, a first size La of the display component in a direction vertical to the first plane is made smaller than a second size Lb of the display component in a direction parallel to the first plane. Thus, when the first display unit 901 is provided within a wearable electronic apparatus, for example, when the electronic apparatus is smart glasses, the display component 100 is provided within a frame at one side (i.e., glass leg) of the smart glasses, it is such configured so that thickness of the frame within which the display component 100 is provided is thinner. Similarly, when the electronic apparatus is a smart watch, the display component 100 is provided within a wrist strap at one side of the smart watch, and it is such configured so that thickness of the wrist strap within which the display component 100 is provided is thinner. Accordingly, the display component 100 according to the eighth embodiment of the present application achieves a thickness reduction in a specific direction, and thereby achieves a thickness reduction in a corresponding direction of the first display unit 901.

Figure 10A:
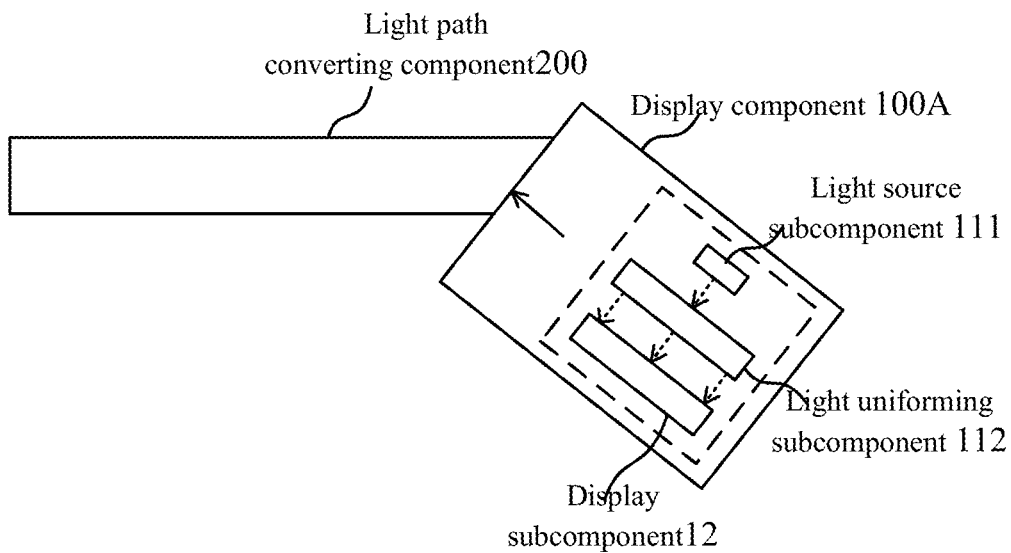
FIGS. 10A and 10B are structural block diagrams illustrating a second example of the first display unit according to a second example of the first display unit according to an embodiment of the present application.
Figure 10B:
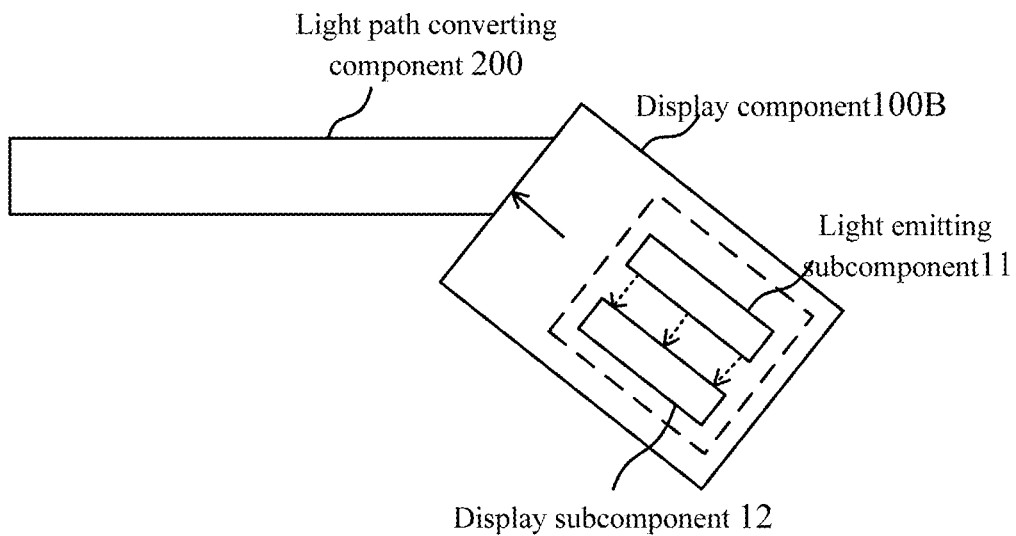

FIGS. 10A and 10B are structural block diagrams illustrating a second example of the first display unit according to a second example of the first display unit according to an embodiment of the present application. Similar to the first display unit 901 according to the embodiment of the present application as shown in FIG. 9, the first display unit 902 according to the embodiment of the present application also comprises a display component 100 and a light path converting component 200. As shown in FIG. 10A, the conventional display component 100A specifically comprises a light source subcomponent 111, a light uniforming subcomponent 112, and a display subcomponent 12, wherein the light uniforming subcomponent 112 sets the light source subcomponent 111 overlapped in an emission direction of the initial light corresponding to the first image, and uniforms a point light source emitted by the light source subcomponent 111 as backlight. Different than that, as shown in FIG. 10B, in the first display unit 902 according to the embodiment of the present application, the display component 100B specifically comprises a light emitting subcomponent 11 and a display subcomponent 12. The light emitting subcomponent 11 is configured to generate and emit plane backlight (light indicated by the dotted-line arrow shown in FIG. 10B), which is on the first plane as described with reference to FIG. 9. The display subcomponent 12 is provided within an irradiation area of the backlight, and configured to generate the initial light corresponding to the first image based on the first image (e.g. light indicated by the solid-line arrow shown in FIG. 10B).

Therefore, in the first display unit 902 according to the embodiment of the present application as shown in FIG. 10B, a combination manner of a single point light source and an optical light uniforming system as shown in FIG. 10A is replaced with a single light emitting subcomponent 11 that emits plane backlight, so that thickness of the display component 100 in the second display unit 902 according to the embodiment of the present application is reduced in the emission direction of the initial light corresponding to the first image.

Figure 11:
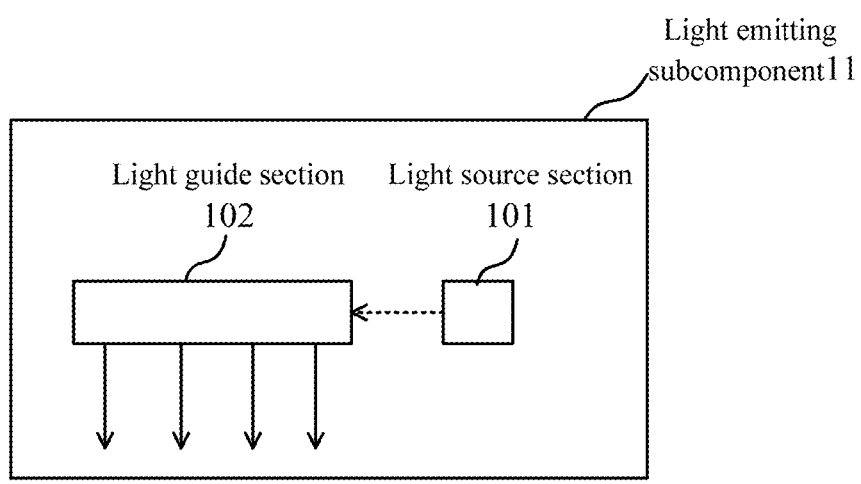
FIG. 11 is a structural block diagram illustrating a light emitting subcomponent in the first display unit according to an embodiment of the present application.

FIG. 11 is a structural block diagram illustrating a light emitting subcomponent in the first display unit according to an embodiment of the present application. The light emitting subcomponent 11 as shown in FIG. 11 may be an implementation of the light emitting subcomponent that emits plane backlight in the first display unit 902 according to the embodiment of the present application as shown in FIG. 10B. The light emitting subcomponent 11 in the display unit according to the embodiment of the present application comprises a light source section 101 and a light guide section 102 in particular. Specifically, the light source section 101 is configured to emit light towards a second direction (light indicated by the dotted-line arrow shown in FIG. 11), the light guide section 102 is provided within an irradiation area of the light, the light transmits through the light guide section 102 to form the backlight (light indicated by the solid-line arrow shown in FIG. 11). That is, the light guide section 102 converts light emitted by the light source section 101 which serves as a single point light source into plane backlight, which is located on the first plane described above with reference to FIG. 9. In an embodiment of the present application, the light source section 101 may be an LED light source, and the light emitting subcomponent 11 may further comprise an optical film. Thickness of the whole light emitting subcomponent 11 is controlled for example within 1.5 mm, and the emission angle of the plane backlight converted by the light guide section 102 is controlled within 14 degrees, that is, an maximum angle between an exit direction of the backlight formed by the light guide section 102 and the second direction is 7 degrees. Therefore, the exit direction of the plane backlight converted by the light guide section 102 approximately is considered as in the same direction (i.e., the second direction), which avoids the generation of stray light that exits towards a direction different than the second direction.

Therefore, in the light emitting subcomponent 11 of the display unit according to the thirteenth embodiment of the present application, the light emission direction of the light source section 101 is different than the light emission direction of the light converted by the light guide section 102 (i.e., in a direction vertical to the emission direction of the backlight, the light source section 101 is provided at a side of the light guide section 102), so that in comparison with the case of providing the light source subunit and the light guide subunit overlapped in the emission direction of the backlight, thickness of the display component 10 in the display unit 903 according to the embodiment of the present application is reduced in the emission direction of the initial light corresponding to the first image.

Figure 12:
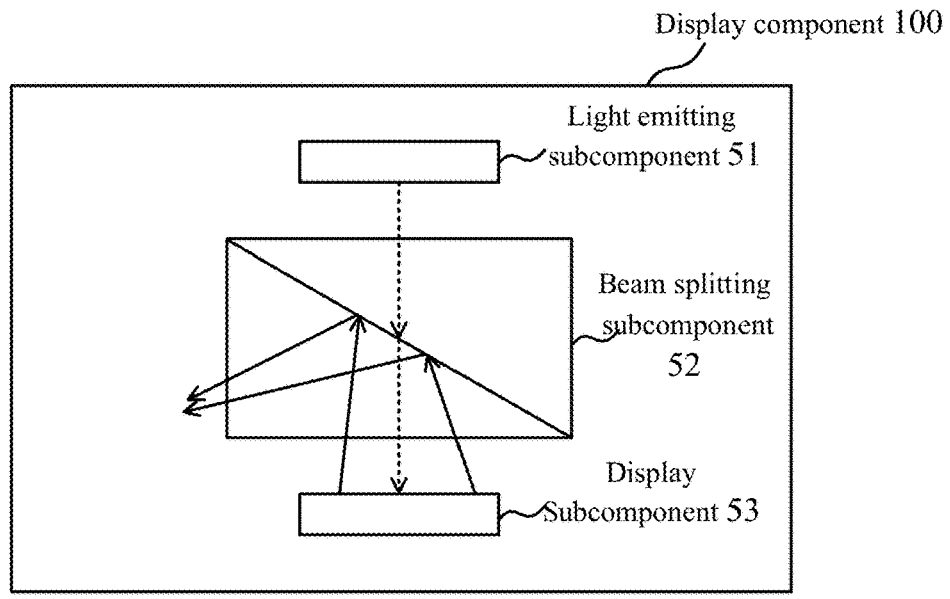
FIG. 12 is a structural block diagram illustrating a display component in the first display unit according to an embodiment of the present application.

FIG. 12 is a structural block diagram illustrating a display component in the first display unit according to an embodiment of the present application. As shown in FIG. 12, the display component 100 in the first display unit according to the fourteenth embodiment of the present application comprises a light emitting subcomponent 51, a display subcomponent 52, and a beam splitting subcomponent 53. Specifically, the light emitting subcomponent 51 is configured to emit backlight (light indicated by the dotted-line arrow shown in FIG. 12). As described above, the light emitting subcomponent 51 may be a light emitting subcomponent that emits plane backlight as described above with reference to FIGS. 10 and 11. The backlight from the light emitting subcomponent 51 transmits through the beam splitting subcomponent 53. In an embodiment of the present application, the beam splitting subcomponent 53 is a polarization beam splitter (PBS). P-polarized backlight emitted by the light emitting subcomponent 51 transmits through the PSB that serves as the beam splitting subcomponent 53, so as to illuminate the display subcomponent 52. The display subcomponent 52 is provided within an irradiation area of the backlight, and configured to generate the initial light corresponding to the first image based on the first image (light indicated by the solid-line arrow shown in FIG. 12). Further, the initial light corresponding to the first image from the display subcomponent 52 (after being modulated as S-polarized light) is reflected at the PBS which serves as the beam splitting subcomponent 53, to be guided to the light path converting component via the beam splitting subcomponent 53.

Figure 13:
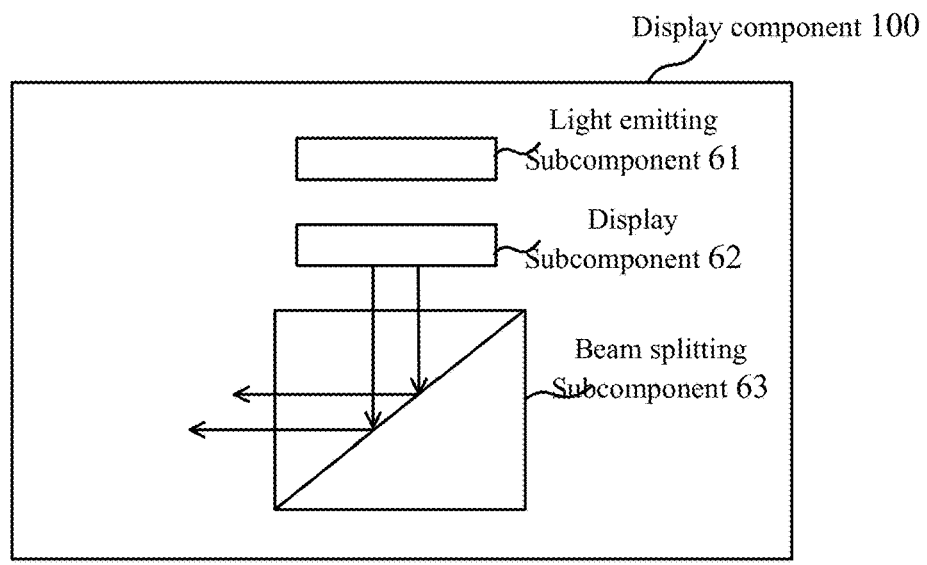
FIG. 13 is a structural block diagram illustrating a display component in the first display unit according to an embodiment of the present application.

FIG. 13 is a structural block diagram illustrating a display component in the first display unit according to an embodiment of the present application. As shown in FIG. 13, the display component 100 in the first display unit according to the fifteenth exemplary embodiment of the present application comprises a light emitting subcomponent 61, a display subcomponent 62, and a beam splitting subcomponent 63. Specifically, the display subcomponent 62 is configured to generate a display signal corresponding to the first image based on the first image. The light emitting subcomponent 61 is configured to generate the initial light corresponding to the first image based on the display signal. That is, the light emitting subcomponent 61 and the display subcomponent 62 in the first display unit according to the embodiment of the present application may be implemented as a self-luminous type OLED display device, the display subcomponent 62 is a control unit that generates a display drive signal based on the fifteenth image to be displayed, the light emitting subcomponent 61 is a self-luminous layer that executes emitting display based on the received display drive signal. Similar to the case described with reference to FIG. 12, the beam splitting subcomponent 63 is configured to guide the initial light corresponding to the first image from the display unit to the light path converting component. In an embodiment of the present application, the beam splitting subcomponent 63 is a polarization beam splitter (PBS).

Therefore, in the display component 100 of the first display unit according to the embodiment of the present application, the display unit and the light emitting unit are integrally provided on one side of the beam splitting unit, so that a size of the first display unit in the direction of generating the initial light is smaller than a size of first display unit in the direction of generating the initial light in the case where the display unit and the light emitting unit are integrally provided on both sides of the beam splitting unit (the case shown with reference to FIG. 12).

Figure 14:
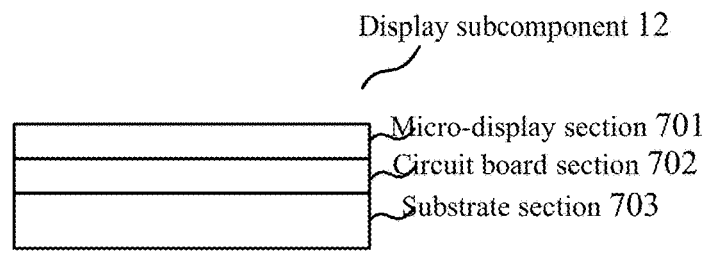
FIG. 14 is a structural block diagram illustrating a display subcomponent in the first display unit according to an embodiment of the present application.

FIG. 14 is a structural block diagram illustrating a display subcomponent in the first display unit according to an embodiment of the present application. The display subcomponent 12 shown in FIG. 14 may be applied to the display component described with reference to FIGS. 10 to 13. As shown in FIG. 14, the display subcomponent 12 comprises a micro-display section 701, a circuit board section 702, and a substrate section 703. Specifically, the micro-display section 701 is configured with an array of a plurality of pixel cells, each pixel cell being used for generating the initial light corresponding to the first image. The circuit board section 702 is configured to provide a control signal based on the first image to control the pixel cells in the micro-display section 701 to generate the initial light corresponding to the first image. The substrate section 703 is configured to arrange the micro-display section 701 and the circuit board section 702 thereon. Flexural strength and fracture toughness of the substrate section 703 may be denoted by the following equations:

$$\sigma_f = \sqrt{\frac{2E\gamma_f}{C}} \quad \text{(Equation 1)}$$

$$K_{ZC} = \sqrt{2Z\gamma_f} \quad \text{(Equation 2)}$$

where $\sigma_f$ is flexural strength, $K_{ZC}$ is fracture toughness, E is elastic modulus, $\gamma_f$ is fracture energy, and C is crack size. As can be seen from the above Equations 1 and 2, in order to improve strength of the material, fracture energy and elastic modulus must be increased, to reduce fracture size. To achieve toughness of the material, fracture energy and elastic modulus must be increased. It is known that the substrate subunit is typically made from metal material like aluminum, which always reaches a thickness of 1.6 mm. Elastic modulus of the non-metallic material, like ceramic material, is much larger than that of the metals, often higher by one to several times.

Thus, in the display subcomponent of the first display unit according to the embodiment of the present application, the substrate section 703 is made from non-metallic material that satisfies a predetermined intension, so that thickness of the substrate subunit is lower than that of the substrate section 703 made from metallic material that satisfies a predetermined intension (e.g., as low as 0.25 mm).

Figure 15A:
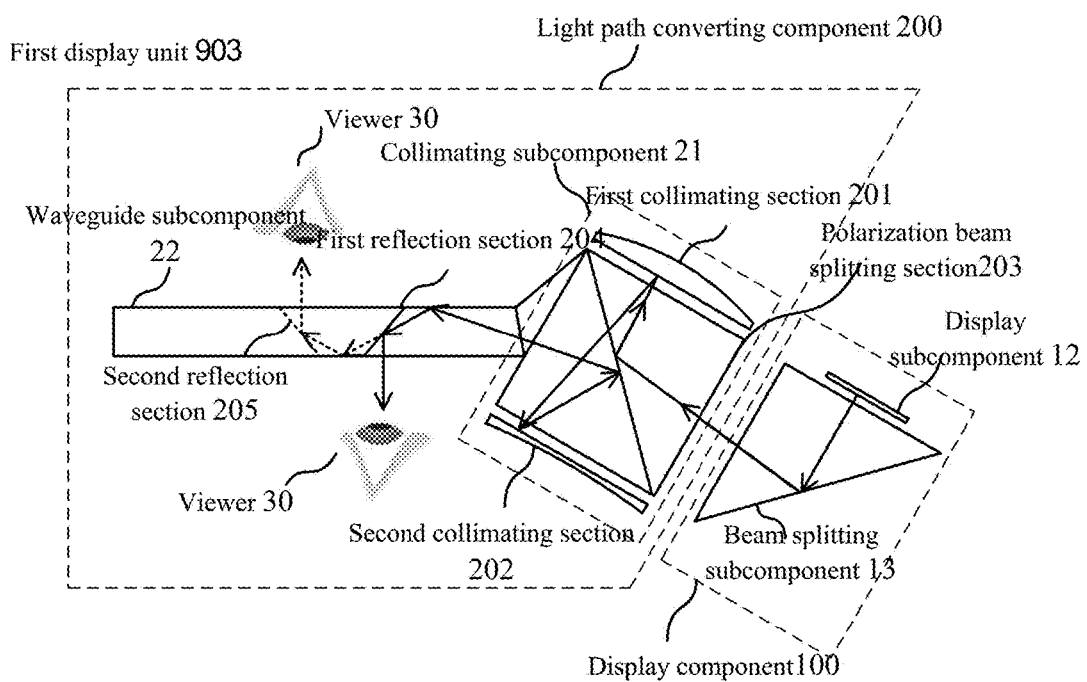
FIGS. 15A and 15B are structural block diagrams illustrating a third example of the first display unit according to an embodiment of the present application.
Figure 15B:
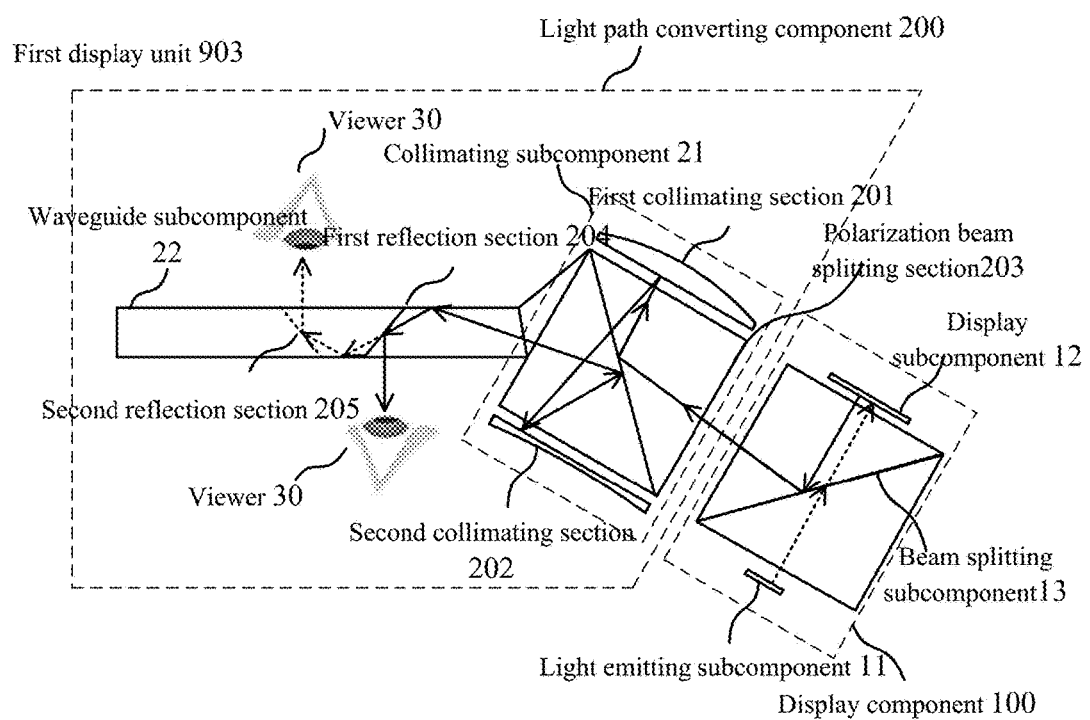

FIGS. 15A and 15B are structural block diagrams illustrating a third example of the first display unit according to an embodiment of the present application. The first display unit according to the embodiment of the present application as shown in FIGS. 15A and 15 specifically comprises a display component 100 and a light path converting component 200.

Specifically, the display component 100 comprises a display subcomponent 12 and a beam splitting subcomponent 13 (as shown in FIG. 15A), this type of display component has already been described above with reference to FIG. 13. Alternatively, the display component 100 comprises a light emitting subcomponent 11, a display subcomponent 12, and a beam splitting subcomponent 13 (as shown in FIG. 15B), this type of display component has already been described above with reference to FIG. 12. Here, repeated descriptions of the display component 100 and its light path will be omitted.

As shown in FIGS. 15A and 15B, the light path converting component 200 further comprises a collimating subcomponent 21 and a waveguide subcomponent 22, the collimating subcomponent 21 is configured to collimate the initial light corresponding to the first image from the display component 100 into collimated light corresponding to the first image, and lead the same into the waveguide subcomponent 22. Specifically, the collimating subcomponent 21 comprises a first collimating section 201 and a second collimating section 202 provided opposite to each other and a polarization beam splitting section 203 provided between the first collimating section 201 and the second collimating section 202, the initial light corresponding to the first image from the display component 100 is reflected by the polarization beam splitting section 203 to the first collimating section 201, thereafter it is collimated by the first collimating section 201 and the second collimating section 202, and exited by the polarization beam splitting section 203 as the collimated light corresponding to the first image. The waveguide subcomponent 22 guides the collimated light from the collimating subcomponent 21 to the particular position, wherein the collimated light corresponding to the first image is for forming the virtual image corresponding to the first image. In an embodiment of the present application, the first collimating section 201 and the second collimating section 202 may be a single lens or a lens group as needed by design. It is possible to implement adjustment of a size of the virtual image corresponding to the first image by adjusting the relative position of the lens or lens group by which the first collimating section 201 and the second collimating section 202 are configured.

In addition, as shown in FIGS. 15A and 15B, the waveguide subcomponent 22 further comprises a first reflection section 204 and/or a second reflection section 205, it is possible to control to guide the collimated light from the collimating subcomponent 21 and corresponding to the first image to the particular position to exit, by setting the position and angle of the first reflection section 204 and/or the second reflection section 205. In a first case, the collimating subcomponent 21 and the display component 10 are located at a first side relative to the plane on which the waveguide subcomponent 22 is located, when the first reflection section 204 as shown in FIGS. 15A and 15B is provided, it is possible to exit towards the first side. In a second case, when the second reflection section 205 as shown in FIGS. 15A and 15B is provided, the collimated light corresponding to the first image may exit towards a second side relative to the plane on which the waveguide subcomponent 22 is located, the first side and the second side are opposite sides relative to the plane on which the waveguide subcomponent is located. Specifically, when the display device is applied to for example a head-mounted electronic apparatus, it is possible to adopt the configuration example in the first case, the collimated light corresponding to the first image is made to exit towards the first side, that is, the collimated light is made to exit towards the eyes of a user wearing the head-mounted electronic apparatus. When the display device is applied to for example a wrist-mounted electronic apparatus, it is possible to adopt the configuration example in the second case, the collimated light corresponding to the first image is made to exit towards the second side, that is, the collimated light is made to exit towards the eyes of a user wearing and viewing the wrist-mounted electronic apparatus. In addition, it will be further explained below in detail that the exit direction of the display device can be set as required by viewing, for example, rotation of the first reflection section 204 and/or the second reflection section 205 may be controlled, so as to control the exit direction of the first reflection section 204 and/or the second reflection section 205, thus achieving a switch of bi-directional display of the display device.

Therefore, in the display device according to the embodiment of the present application, in the collimating subcomponent 21, a folded imaging light path between the first collimating section 201 and the second collimating section 202 is implemented by using the polarization beam splitting section 203, thereby an overall size of the display device is reduced.

Figure 16A:
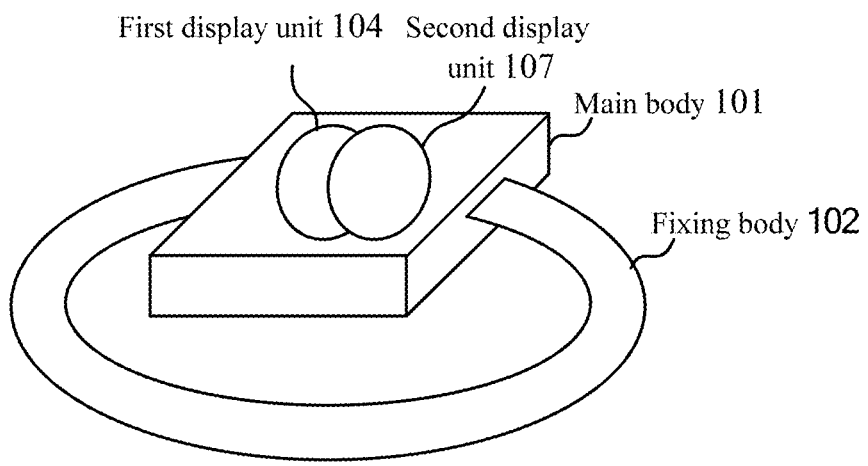
FIGS. 16A to 16B are structural block diagrams illustrating an electronic apparatus according to another embodiment of the present application.
Figure 16B:
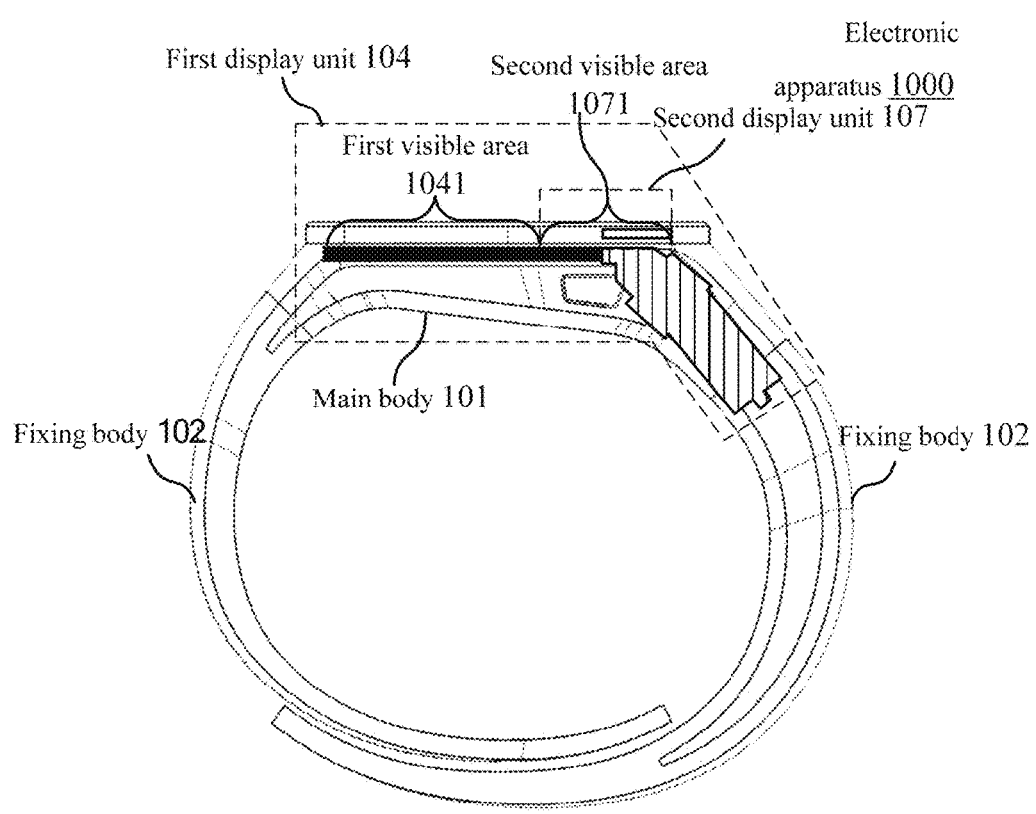

FIGS. 16A to 16B are structural block diagrams illustrating an electronic apparatus according to another embodiment of the present application. As shown in FIG. 16A, the electronic apparatus 1000 according to another embodiment of the present application further comprises a second display unit 107 configured to execute display of image and provided within the main body 101 and/or the fixing body 102, wherein the first display unit 104 and the second display unit 107 are different types of display unit.

As shown in FIG. 16B, the first display unit 104 has a first visible area 1041, the second display unit 107 has a second visible area 107I, an edge where the first visible area 1041 and the second visible area 107I border on each other is a curve. As can be seen from FIGS. 16A and 16B, in order to concurrently configure the first display unit 104 and the second display unit 107 in the electronic apparatus 1000, the second display unit 107 needs to satisfy being an irregular shape and a narrow frame.

Hereinafter, the second display unit 107 will be further described with reference to FIGS. 17 to 25B.

The second display unit according to an embodiment of the present application may be a second display unit such as a liquid crystal display, an LED display, a plasma display or the like to which a drive signal needs to be provided.

Figure 17:
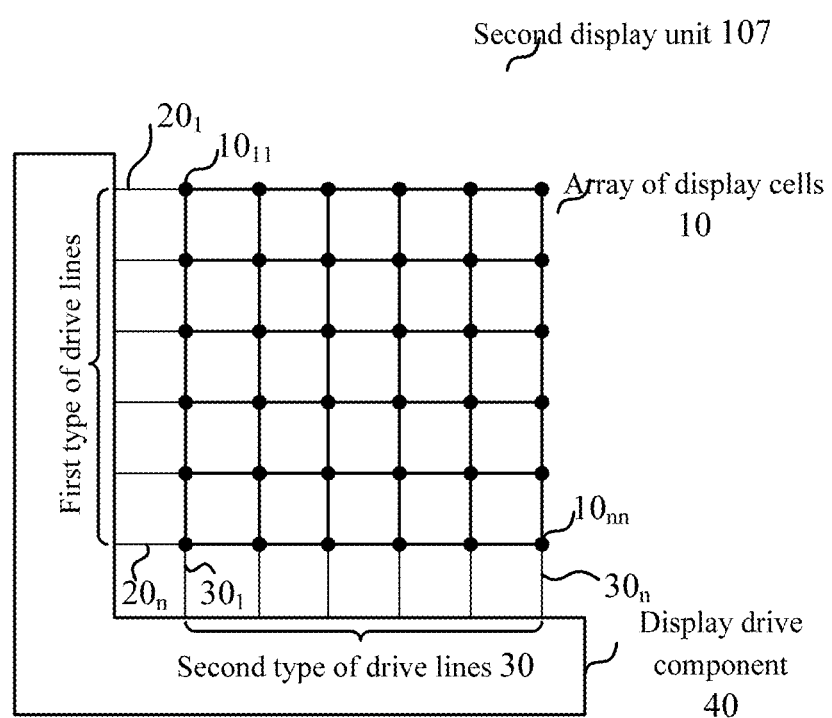
FIG. 17 is a structural block diagram briefly illustrating the second display unit according to an embodiment of the present application.

FIG. 17 is a structural block diagram briefly illustrating the second display unit according to an embodiment of the present application. As shown in FIG. 17, the second display unit 107 comprises an array of display cells 10, a plurality of first type of drive lines 20, a plurality of second type of drive lines 30, and a display drive component 40. Specifically, the array of display cells 10 comprises a plurality of display subunits $10_{11} \ldots 10_{nn}$. As can be readily appreciated, the array of display cells 10 composed by a plurality of display subunits as shown in FIG. 17 is merely illustrative, wherein the number of the plurality of display subunits and their specific layout may vary depending on the design and use requirements. Each $(20_1 \ldots 20_n)$ of the plurality of first type of drive lines 20 intersects with each $(30_1 \ldots 30_n)$ of the plurality of second type of drive lines 30, intersection thereof corresponds to each display subunit of the plurality of display subunits $(10_{11} \ldots 10_{nn})$, so as to provide a display drive signal for each display subunit. The display drive component 40 is connected with the plurality of first type of drive lines and the plurality of second type of drive lines, so as to provide a display drive signal for the plurality of first type of drive lines and the plurality of second type of drive lines.

Different than the configuration manner that a plurality of first type of drive lines and a plurality of second type of drive lines are connected respectively to a horizontal drive unit and a vertical drive unit, the second display unit 107 according to an embodiment of the present application may comprise only a single display drive component 40, thereby wiring space needed for arranging the display drive component is saved and design complexity is simplified. In addition, in the second display unit 107 according to an embodiment of the present application, the plurality of first type of drive lines 20 and the plurality of second type of drive lines 30 are divided into at least two groups of drive lines, each group of the at least two groups of drive line is connected to the display drive component 40. Such way of connecting the drive lines in group will greatly reduce the edge wiring of the second display unit 107, so that the frame that packets it can become narrow as much as possible and flexibly adapt to different frame shapes. Specific configurations of the second display unit according to the embodiment of the present application will be further described below with reference to FIGS. 18A to 25B.

Figure 18A:
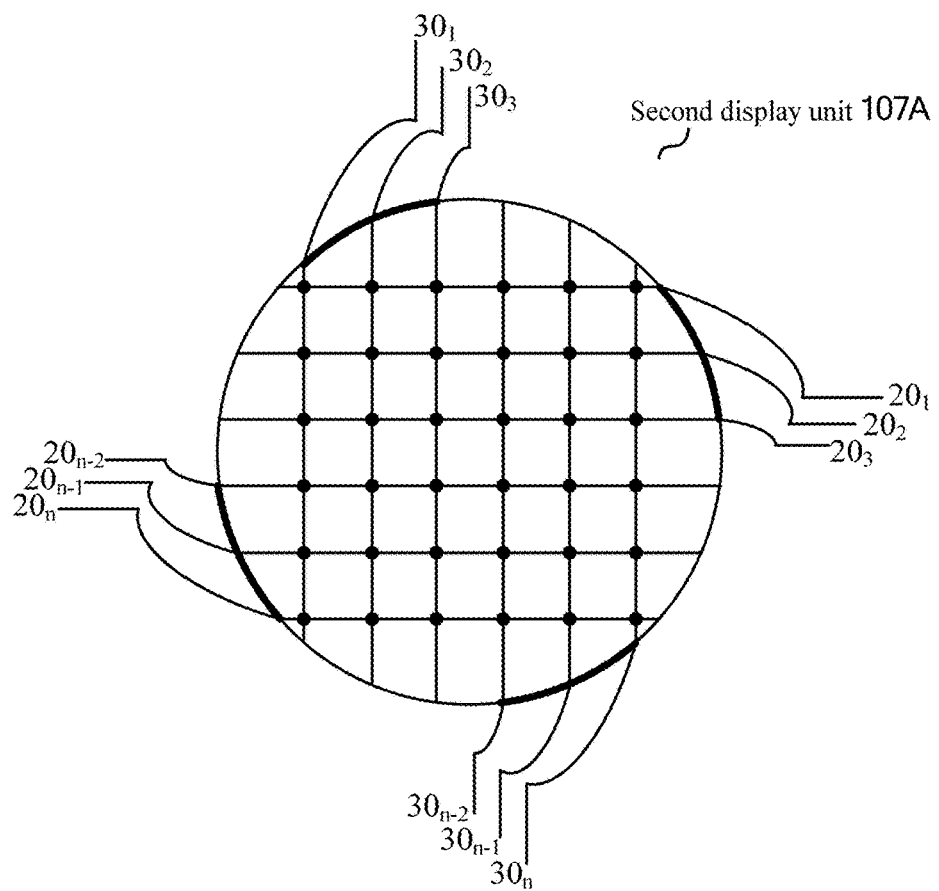
FIGS. 18A to 18C are a top surface view, a bottom surface view, and a side view illustrating a first example of the second display unit according to an embodiment of the present application.
Figure 18B:
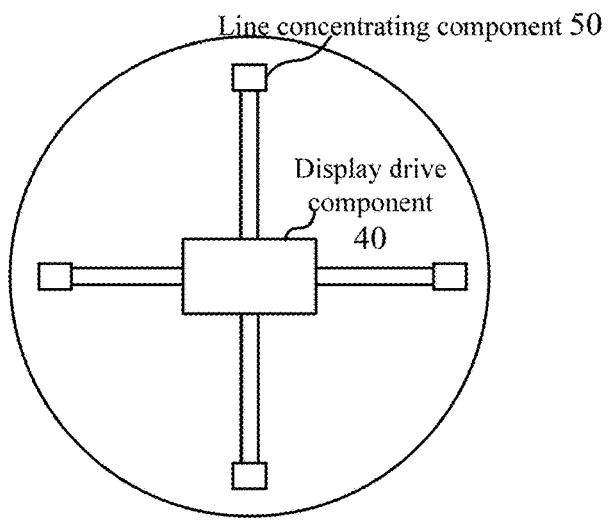
Figure 18C:
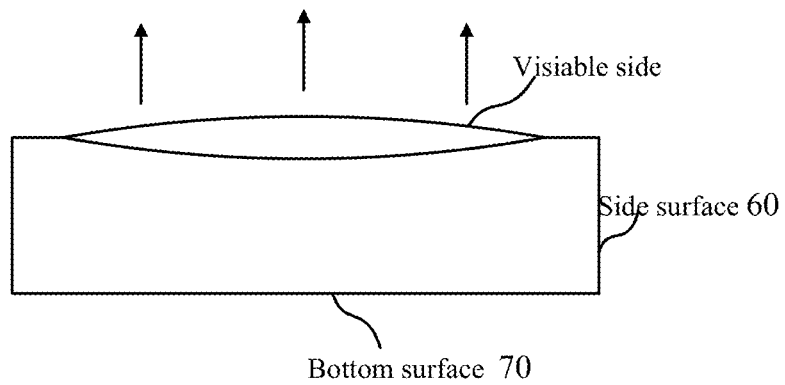

FIGS. 18A to 18C are a top surface view, a bottom surface view, and a side view illustrating a first example of the second display unit according to an embodiment of the present application. Specifically, FIG. 18A is a top surface view illustrating a second display unit 107A according to the first embodiment of the present application. As can be readily appreciated, the number of the drive lines and the wiring manner as shown in FIG. 18A are merely illustrative, the second display unit 107A according to an embodiment of the present application is not limited thereto. As shown in FIG. 18A, the plurality of first type of drive lines and the plurality of second type of drive lines are divided into a plurality of groups of drive lines (four groups as shown in FIG. 18A). As can be seen from FIG. 18A, by adopting such grouped wiring manner, the wiring area at the edge of the second display unit 107A tends to cluster, which thereby facilitates further narrowing the frame of the second display unit 107A. That is to say, in an electronic apparatus where the second display unit 107A according to an embodiment of the present application is configured, the second display unit 107A can adapt to the shape of the electronic apparatus as needed. Specifically, by adopting grouped configuration for the wiring of the second display unit 107A, it is possible to select the edge of the second display unit 107A that adapt to wiring based on the shape of the electronic apparatus as the area where wiring groups are configured, and select not to configure wiring at the edge having no wiring space of the second display unit 107A based on the shape of the electronic apparatus. Herein, the edge having no wiring space of the second display unit 107A may be an edge where the edge of the second display unit 107A substantially overlaps with the outer frame of the electronic apparatus per se. Alternatively, the edge of having no wiring space the second display unit 107A may be an edge of the electronic apparatus where the outer frame thereof is of an irregular shape and thus is inconvenient for wiring. Detailed examples will be described below with reference to the drawings.

Further, FIG. 18B is a bottom surface view illustrating a second display unit 107A according to the fourth embodiment of the present application. As shown in FIG. 18B, the second display unit 107A further comprises a plurality of line concentrating components 50, each group of the plurality of groups of drive lines, into which the plurality of first type of drive lines and the plurality of second type of drive lines are divided, is connected to the display drive component 40 via one of the line concentrating components 50, number of input terminals of one of the line concentrating components 50 connected with each group of the at least two groups of drive lines is M, number of output terminals connected to the display drive component 40 is N, and M>N. In the embodiment shown in FIG. 18B, number of the input terminals by which one of the line concentrating components 50 and one group of drive lines are connected is three, and number of the output terminals connected to the display drive component 40 is two. Adopting such wiring manner of connecting the display drive unit via the line concentrating unit after grouping, it is possible to further reduce the number of wiring needed for executing display drive. As can be readily appreciated, the second display unit 107A according to an embodiment of the present application is not limited thereto, instead, the grouped group of drive lines may be directly connected to the display drive component 40 without the line concentrating component 50.

Furthermore, FIG. 18C is a side view illustrating a second display unit 107A according to the fourth embodiment of the present application. As shown in FIG. 18C, a side of the surface where the array of display cells 10 residues is a visible side, and at least a portion of the plurality of first type of drive lines 20 and the plurality of second type of drive lines 30 and the display drive component 40 are provided at the other side of the surface. In particular, the display drive component 40 is located at a bottom surface 70 of the second display unit 107A5, the second display unit 107A further comprises a side surface 60 that connects an edge of the surface where the array of display cells 10 residues and the bottom surface 70, the plurality of first type of drive lines 20 and the plurality of second type of drive lines 30 are provided along the side surface 60. In the side view as shown in FIG. 18C, a distance from a projection, on a plane vertical to the visible direction (that is, the bottom surface 70), of part of the plurality of first type of drive lines 20 and the plurality of second type of drive lines 30 on the surface where the array of display cells 10 residues to the edge of the surface where the array of display cells 10 residues is L. The distance L satisfies being less than a predetermined threshold. The predetermined threshold may be set as needed by design and display requirements, for example, it may be set as ten mm, five mm, or one mm. Even in the case of grouped wiring, the distance L may be zero. That is to say, at the edge where the drive lines do not turn downward so as to connect the display drive component 40, it is possible that there is no wiring for the drive lines, and at the edge of this portion, the frame other than the visible area on the surface where the array of display cells residues is the narrowest.

Figure 19A:
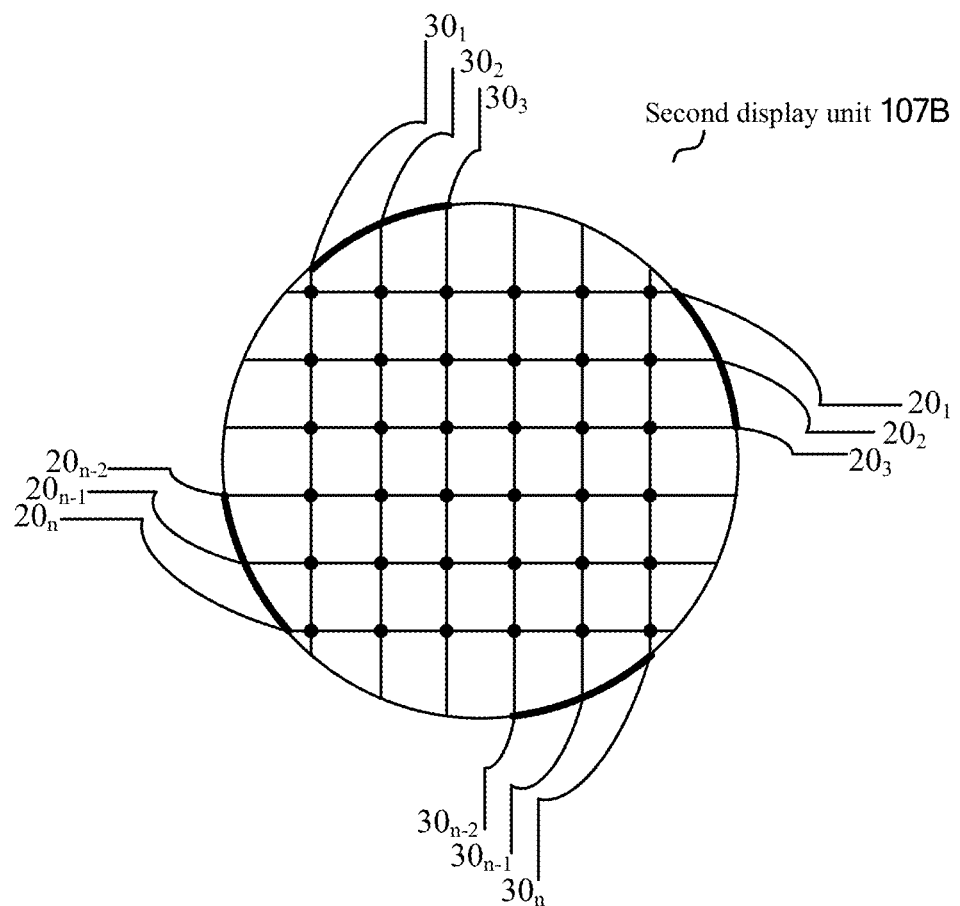
FIGS. 19A to 19B are schematic diagrams illustrating a second example of the second display unit according to an embodiment of the present application.
Figure 19B:
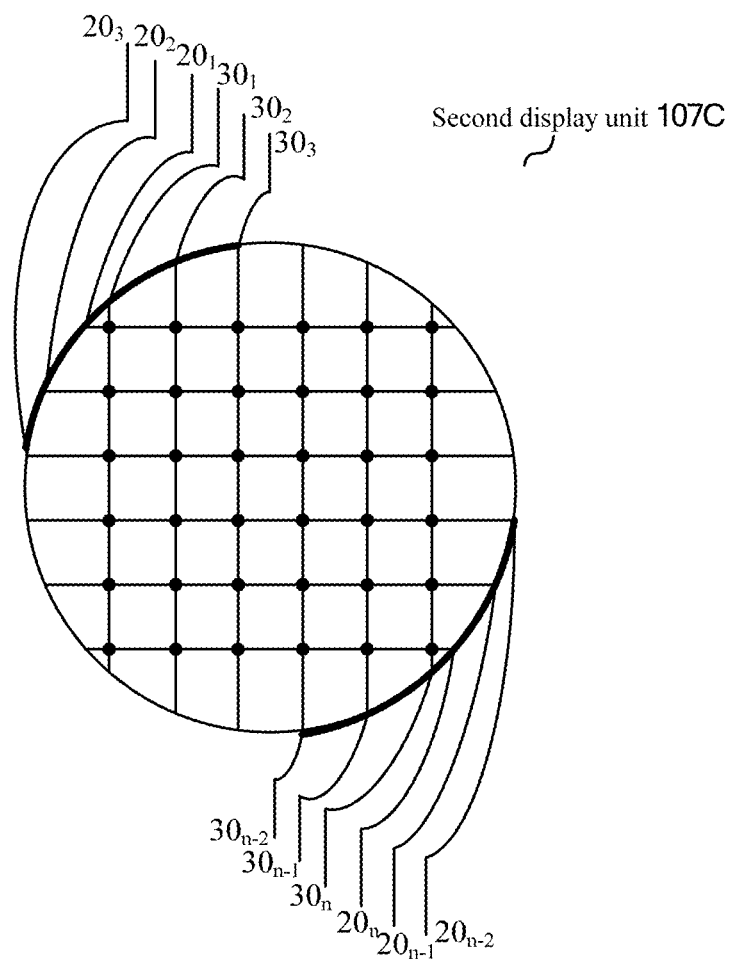

FIGS. 19A to 19B are schematic diagrams illustrating a second example of the second display unit according to an embodiment of the present application. In the second display units 107B and 107C according to the embodiment of the present application, each group into which the plurality of first drive lines and the plurality of second drive lines are divided may comprise only the first type of drive lines or the second type of drive lines, or each group into which the plurality of first drive lines and the plurality of second drive lines are divided may comprise the first type of drive lines and the second type of drive lines. Specifically, as shown in FIG. 19A, in the second display unit 107B according to the embodiment of the present application, each group into which the plurality of first drive lines and the plurality of second drive lines are divided may comprise only the first type of drive lines (the group composed by $20_1$, $20_2$, $20_3$ and the group composed by $20_{n-2}$, $20_{n-1}$, $20_n$) or the second type of drive lines (the group composed by $30_1$, $30_2$, $30_3$ and the group composed by $30_{n-2}$, $30_{n-1}$, $30_n$). In contrast, as shown in FIG. 19B, in the second display units 107C according to the embodiment of the present application, each group into which the plurality of first drive lines and the plurality of second drive lines are divided may comprise the first type of drive lines (the group composed by $20_1$, $20_2$, $20_3$ $30_1$, $30_2$, $30_3$) and the second type of drive lines (the group composed by $20_{n-2}$, $20_{n-1}$, $20_n$, $30_{n-2}$, $30_{n-1}$, $30_n$). As can be seen from FIGS. 19A to 19B, adopting such grouped wiring manner, the grouping manner of the plurality of first drive lines and the plurality of second drive lines is more flexible, the drive lines can be selected to compose the group as needed by design and display requirements, without being restricted by the type of the drive lines per se.

Figure 20A:
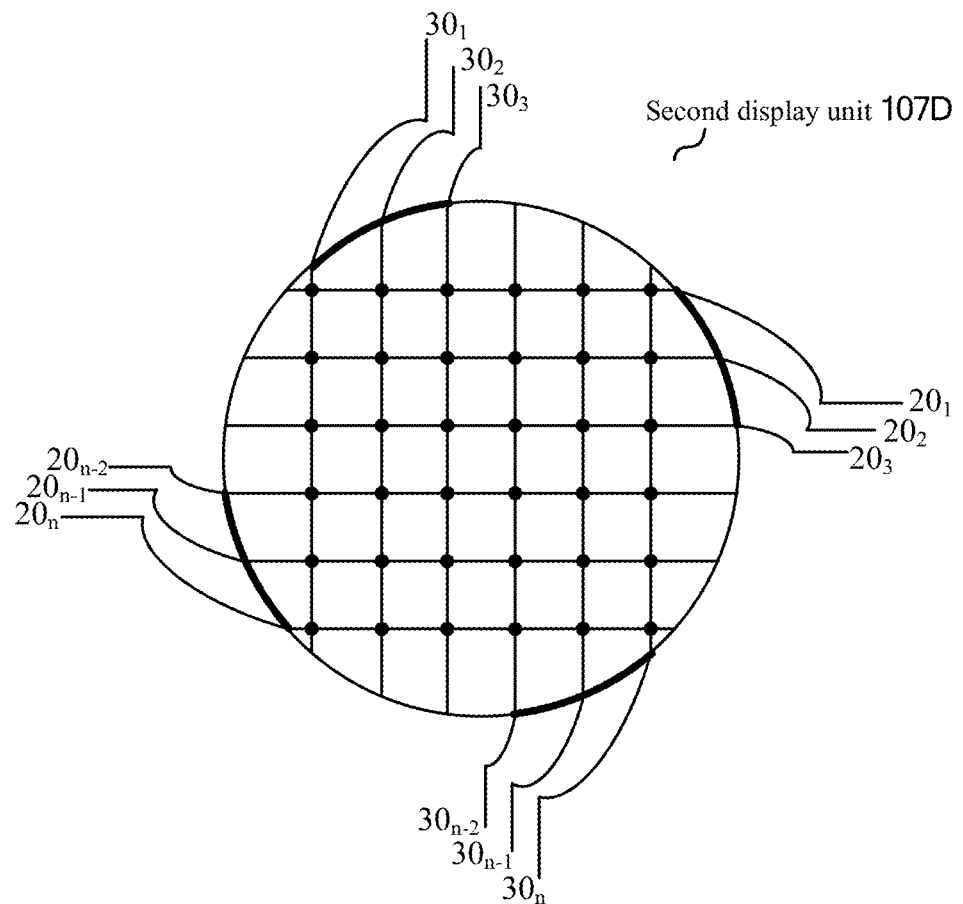
FIGS. 20A to 20B are schematic diagrams illustrating a third example of the second display unit according to an embodiment of the present application.
Figure 20B:
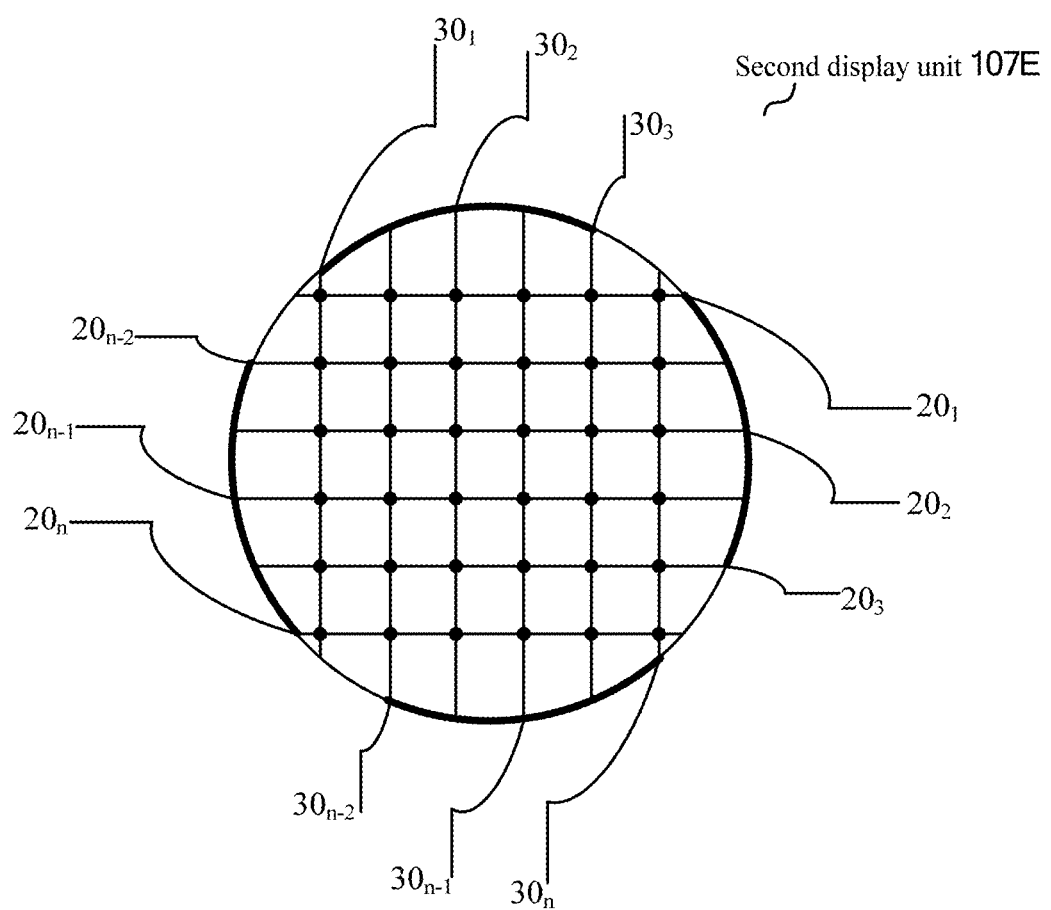

FIGS. 20A to 20B are schematic diagrams illustrating a third example of the second display unit according to an embodiment of the present application. In the second display units 107D and 107E according to the embodiment of the present application, each group into which the plurality of first drive lines and the plurality of second drive lines are divided may comprise only adjacent drive lines, or each group into which the plurality of first drive lines and the plurality of second drive lines are divided may comprise drive lines that are not adjacent. Specifically, as shown in FIG. 20A, in the second display unit 107D according to the embodiment of the present application, each group into which the plurality of first drive lines and the plurality of second drive lines are divided may comprise only adjacent drive lines (e.g., the group composed by adjacent $20_1$, $20_2$, $20_3$; $20_{n-2}$, $20_{n-1}$, $20_n$; $30_1$, $30_2$, $30_3$; $30_{n-2}$, $30_{n-1}$, $30_n$). In contrast, as shown in FIG. 20B, in the second display unit 107E according to the embodiment of the present application, each group into which the plurality of first drive lines and the plurality of second drive lines are divided may comprise drive lines that are not adjacent (e.g., the group composed by $20_1$, $20_3$, $20_5$; $20_{n-4}$, $20_{n-2}$, $20_n$; $30_1$, $30_3$, $30_5$; and $30_{n-4}$, $30_{n-2}$, $30_n$ that are not adjacent). As can be seen from FIGS. 20A and 20B, adopting such grouped wiring manner, the grouping manner of the plurality of first drive lines and the plurality of second drive lines is not limited to grouping the adjacent drive lines, instead it is possible to select the drive lines that are not adjacent to group as needed by design and display requirements, thus avoiding selecting the narrow frame portion of the display device to perform wiring of the drive lines.

Figure 21:
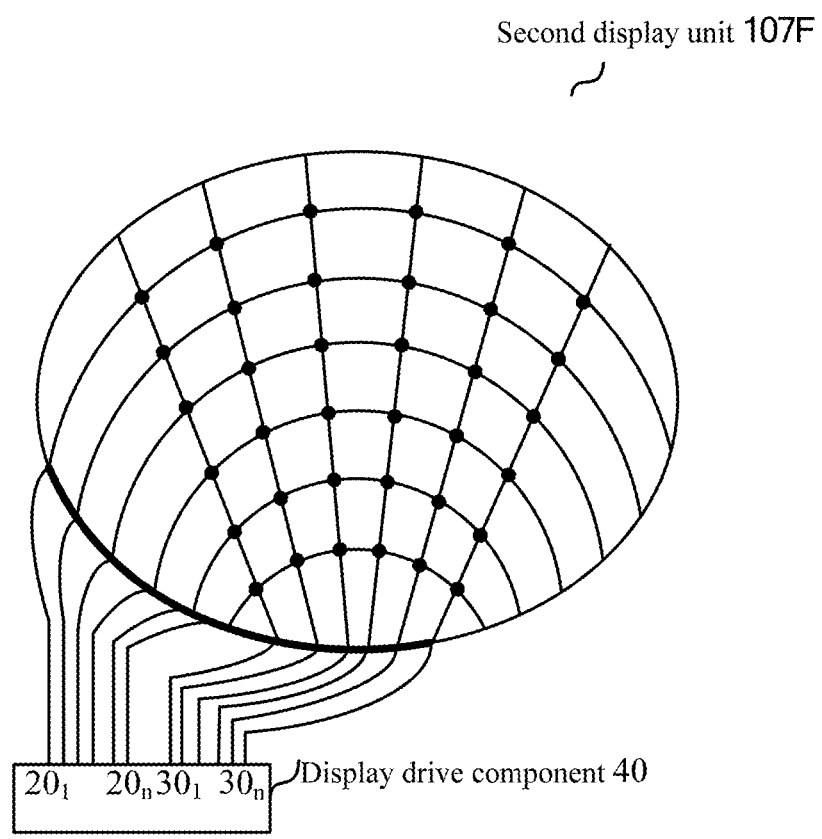
FIG. 21 is a schematic diagram illustrating a fourth example of the second display unit according to an embodiment of the present application.

FIG. 21 is a schematic diagram illustrating a fourth example of the second display unit according to an embodiment of the present application. In the second display unit 107F according to the embodiment of the present application, at least one type of the plurality of first type of drive lines and the plurality of second type of drive lines comprises at least one drive line that is a curve. As shown in FIG. 21, each ($20_1$ ... $20_n$) of the plurality of first type of drive lines 20 is a curve, and each ($30_1$ ... $30_n$) of the plurality of second type of drive lines 30 is a straight line. As can be readily appreciated, the number of the drive lines and the wiring manner as shown in FIG. 21 are merely illustrative, the second display unit according to an embodiment of the present application is not limited thereto. In another embodiment of the present application, it is allowed that the plurality of second type of drive lines ($30_1$ ... $30_n$) are a curve, or alternatively, each or more drive lines among the plurality of first type of drive lines ($20_1$ ... $20_n$) and the plurality of second type of drive lines ($30_1$ ... $30_n$) are a curve.

As shown in FIG. 21, edge of a visible area of the second display unit 107F is divided into two portions, edge of the visible area to which the plurality of first type of drive lines and the plurality of second type of drive lines connected with the display drive component 40 correspond is located in a first portion of the two portions, that is, the edge portion shown with a bolded line in FIG. 21, whereas edge of the visible area where the plurality of first type of drive lines and the plurality of second type of drive lines connected with the display drive component 40 are not arranged is the second portion. In the embodiment shown in FIG. 21, the first portion and the second portion have two intersection points, that is, the first portion and the second portion are two separate continuous edge areas, respectively, only intersect at their respective endpoints. As can be readily appreciated, coverage of the present application is not limited thereto, the first portion and the second portion may be divided into a plurality of sub-portions, respectively, the plurality of sub-portions of the first portion and the second portion may be alternately distributed as shown below with reference to FIGS. 18A to 20B. Since the plurality of first type of drive lines ($20_1 \ldots 20_n$) are a curve, so that edge of the first portion may tend to cluster. That is, an edge length of the visible area corresponding to the first portion is less than 50% of a total edge length of the visible area. For example, in the example shown in FIG. 2, an edge length of the visible area corresponding to the first portion where drive lines are provided is ⅓ of a total edge length of the visible area. Thus, the second display unit 107F is provided with a larger edge area that needs no drive line wiring, which thereby facilitates further narrowing the frame of the second display unit 107F. That is, in an electronic apparatus where the second display unit 107F according to an embodiment of the present application is configured, the second display unit 107F may adapt to the shape of the electronic apparatus as needed. Specifically, by adopting the configuration that at least one type of the plurality of first type of drive lines and the plurality of second type of drive lines comprises at least one drive line that is a curve, it is possible to bent the drive lines towards the edge of the second display unit that adapts to wiring based on the shape of the electronic apparatus, and select not to configure wiring at the edge having no wiring space of the second display unit based on the shape of the electronic apparatus. Herein, the edge having no wiring space of the second display unit may be an edge where the edge of the second display unit substantially overlaps with the outer frame of the electronic apparatus per se. Alternatively, the edge having no wiring space of the second display unit may be an edge of the electronic apparatus where the outer frame thereof is of an irregular shape and thus is inconvenient for wiring.

In addition, as shown in FIG. 21, curve shape of the drive lines conforms to shape of the edge of the second display unit. In the second display unit 107F as shown in FIG. 21, shape of the edge of the second display unit 107F is an ellipse. As can be readily appreciated, depending on application requirements, the shape of the edge of the second display unit according to an embodiment of the present application is not limited to ellipse, instead it may be a variety of regular shapes like circle or irregular shapes. The shape of the drive lines being a curve can implement better conforming to the edge of the second display unit, which is a variety of regular or irregular shapes.

Specifically, the plurality of first type of drive lines ($20_1 \ldots 20_n$) which are curves have the same curvature as the corresponding edge of the second display unit 107E. In particular in the example shown in FIG. 21, the plurality of first type of drive lines ($20_1 \ldots 20_n$) and part of the edge of the second display unit 107F form a curve group having the same circle center and radial outward to the outer center layer by layer, wherein part of the edge of the second display unit 107F is the outermost edge of the concentric nested curve group. Then the plurality of second type of drive lines ($30_1 \ldots 30_n$) may approximately be a plurality of straight lines radiated radially outward from the circle center. Extension lines of the plurality of second type of drive lines ($30_1 \ldots 30_n$) will intersect at the circle center. Further, the plurality of second type of drive lines ($30_1 \ldots 30_n$) may be divided into two groups symmetrical with respect to a center cross-section of the second display unit 107F, for example, drive lines $30_1$, $30_2$, $30_3$, and drive lines $30_{n-2}$, $30_{n-1}$, $30_n$.

In addition, as shown in FIG. 21, the plurality of first type of drive lines ($20_1 \ldots 20_n$) are projected as a plurality of curves arranged equidistantly on a plane vertical to a display direction of the array of display cells. In an embodiment of the present application, a surface where the array of display cells resides probably has fluctuation according to the shape of the electronic apparatus to which it is applied. For example, when the second display unit is applied to a dial of a smart watch which is a convex surface, the surface where the array of display cells resides may be a convex surface corresponding to the dial. The direction of the convex outwardly facing the user is the display direction of the array of display cells, the plurality of first type of drive lines ($20_1 \ldots 20_n$) are projected as a plurality of curves arranged equidistantly on a plane vertical to the display direction.

Figure 22:
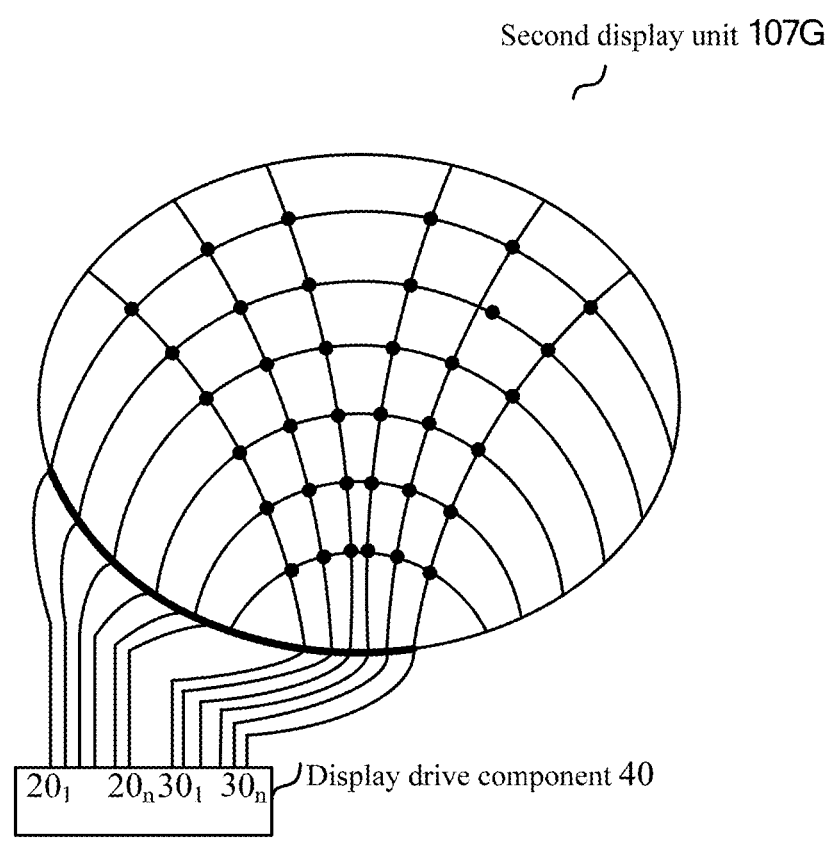
FIG. 22 is a schematic diagram illustrating a fifth example of the second display unit according to an embodiment of the present application.

FIG. 22 is a schematic diagram illustrating a fifth example of the second display unit according to an embodiment of the present application. In the second display unit 107G according to a second embodiment of the present application, each ($20_1 \ldots 20_n$) of the plurality of first type of drive lines 20 and each of ($30_1 \ldots 30_n$) the plurality of second type of drive lines 30 is a curve. Specifically, similar to what is shown in FIG. 2, the plurality of first type of drive lines ($20_1 \ldots 20_n$) and part of the edge of the second display unit 107G form a curve group having the same circle center and radial outward to the outer center layer by layer, wherein part of the edge of the second display unit 107G is the outermost edge of the concentric nested curve group. The plurality of second type of drive lines ($30_1 \ldots 30_n$) are approximately divided into two groups symmetrical with respect to a center cross-section of the second display unit 107G, for example, drive lines $30_1$, $30_2$, $30_3$, and drive lines $30_{n-2}$, $30_{n-1}$, $30_n$, wherein each group of drive lines ($30_1$, $30_2$, $30_3$) or ($30_{n-2}$, $30_{n-1}$, $30_n$) are a portion of a group of inscribed circles that are nested mutually and have a common tangent point.

Accordingly, as compared with the second display unit 107F according to the embodiment of the present application as shown in FIG. 21, by configuring all the plurality of first type of drive lines 20 and the plurality of second type of drive lines 30 as curves, it is possible to further reduce an edge length of the visible area corresponding to the first portion where the drive lines are provided. For example, in the example shown in FIG. 22, an edge length of the visible area corresponding to the first portion where the drive lines are provided is ¼ of a total edge length of the visible area.

Figure 23:
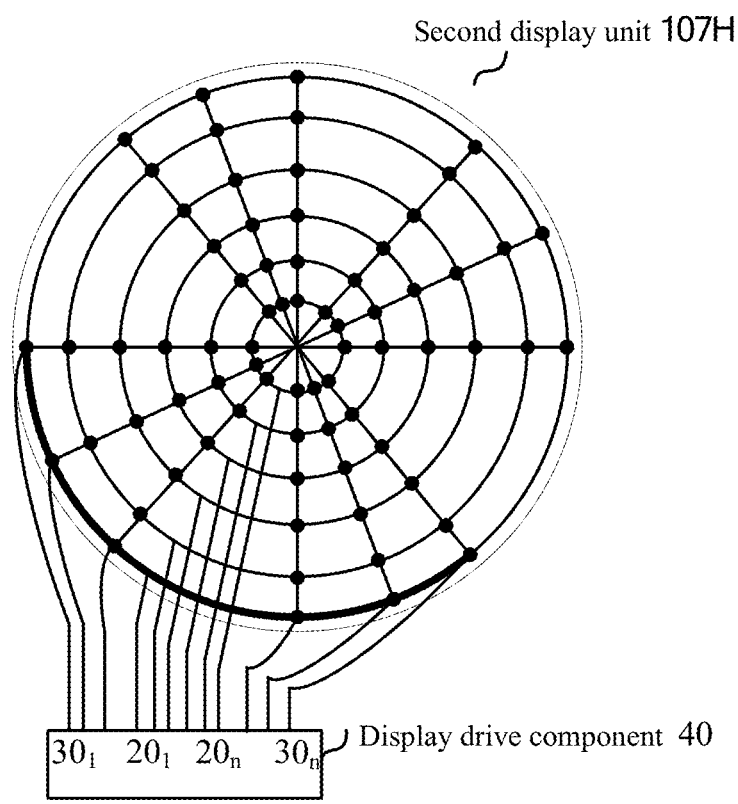
FIG. 23 is a schematic diagram illustrating a sixth example of the second display unit according to an embodiment of the present application.

FIG. 23 is a schematic diagram illustrating a sixth example of the second display unit according to an embodiment of the present application. In the second display unit 107H according to the embodiment of the present application, each ($20_1 \ldots 20_n$) of the plurality of first type of drive lines 20 forms a circle, and each of ($30_1 \ldots 30_n$) the plurality of second type of drive lines 30 is a straight line. Specifically, in the example shown in FIG. 23, the plurality of first type of drive lines ($20_1 \ldots 20_n$) are a group of concentric circles nested concentrically with the edge of the second display unit 107H, wherein the edge of the second display unit 107H is the outermost edge of the group of concentric circles. Then the plurality of second type of drive lines ($30_1 \ldots 30_n$) may approximately be a plurality of straight lines radiated outward from the common circle center of the concentric circles, the plurality of straight lines are the plurality of straight lines of the outermost circle. Accordingly, as compared with the second display unit 107F as shown in FIG. 21 and the second display unit 107G as shown in FIG. 22, by configuring all the plurality of first type of drive lines 20 as circle, it is possible to make the wiring of the drive lines perfectly adapt to the circular outer frame of the display device.

Figure 24:
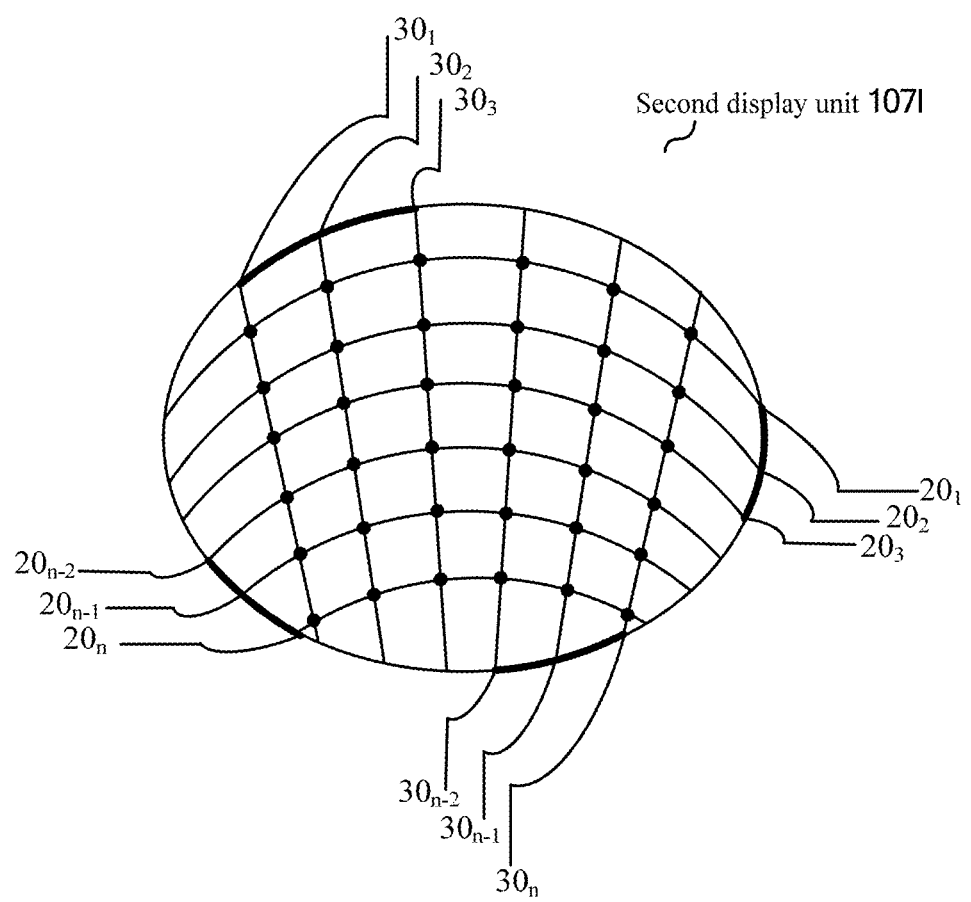
FIG. 24 is a schematic diagram illustrating a seventh example of the second display unit according to an embodiment of the present application.

FIG. 24 is a schematic diagram illustrating a seventh example of the second display unit according to an embodiment of the present application. In the second display unit 107I according to the embodiment of the present application, at least one drive line in at least one group among a plurality of groups of drive lines into which the plurality of first drive lines and the plurality of second drive lines are divided is a curve. Specifically, as shown in FIG. 24, the drive lines $20_1$, $20_2$, $20_3$, $20_{n-2}$, $20_{n-1}$, $20_n$ are curves. In addition, the plurality of first drive lines and the plurality of second drive lines are divided into a plurality of groups of drive lines (four groups as shown in FIG. 24). As can be seen from FIG. 24, adopting such manner of combination of curve configuration and grouping configuration of the drive lines can make the wiring region of the edge of the display device more tend to cluster, facilitate further narrowing the frame of the display device, and meanwhile make the wiring of the drive lines more flexibly adapt to the outer frame of the display device, as compared with the cases of simply adopting the curve configuration (as shown in FIGS. 21 to 23) and those of simply adopting the grouping configuration (as shown in FIGS. 18 to 20B).

Figure 25A:
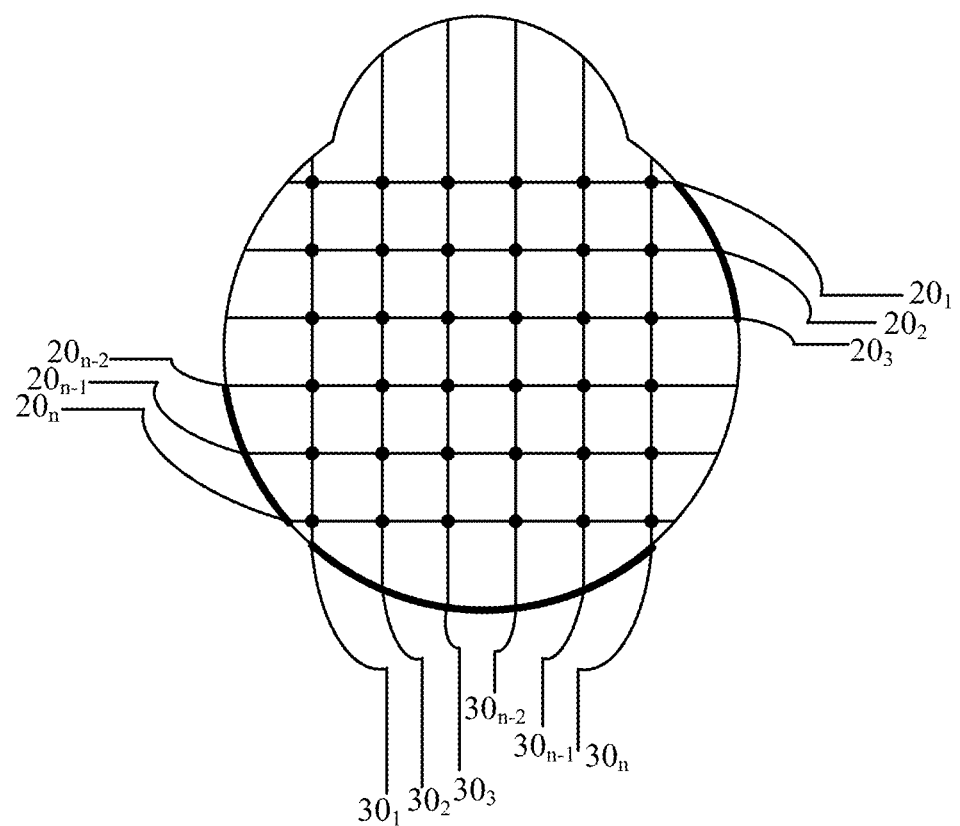
FIGS. 25A to 25B are schematic diagrams illustrating an eighth example of the second display unit according to an embodiment of the present application.
Figure 25B:
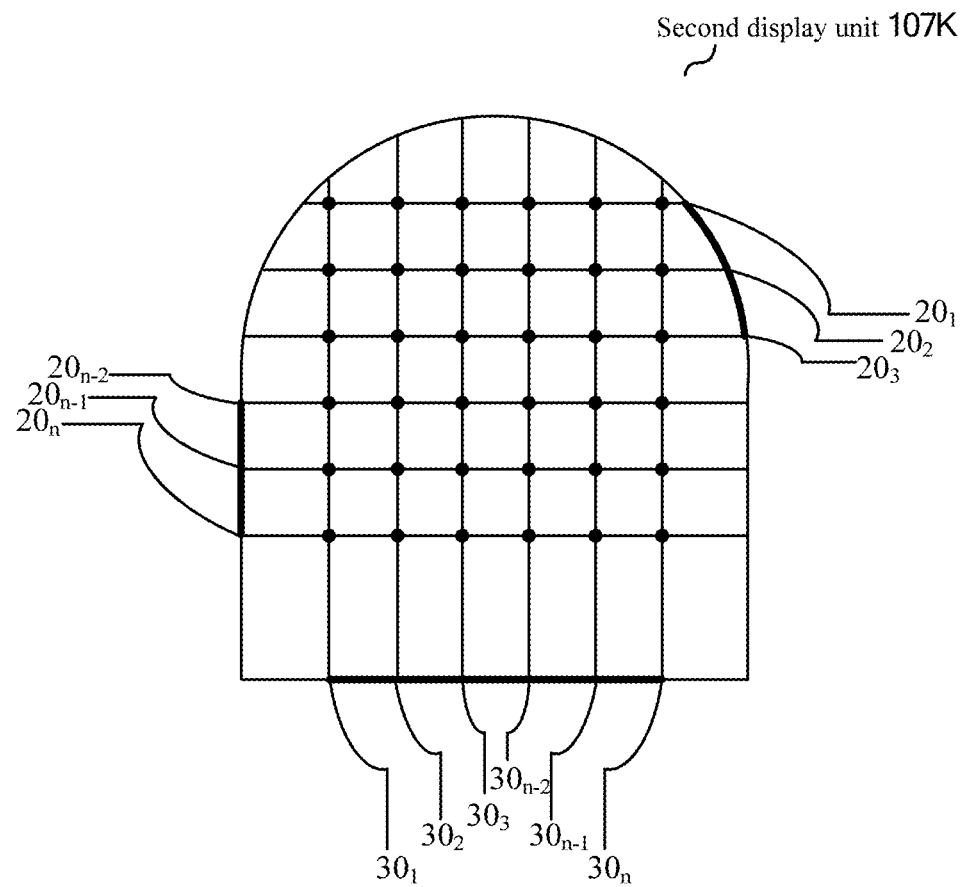

FIGS. 25A to 25B are schematic diagrams illustrating an eighth example of the second display unit according to an embodiment of the present application. In the second display units 107J and 107K according to the eighth embodiment of the present application, at least part of the edge of the surface where the array of display cells 40 residues is a curve, and the edge is at least divided into a first edge portion and a second edge portion, the first edge portion and the second edge portion have different curvatures. Specifically, as shown in FIG. 25A, the edge is divided into an upper first curve edge portion and a lower second curve edge portion, the two portions have different curvatures. Likewise, as shown in FIG. 25B, the edge is divided into an upper first curve edge portion and a lower second straight line edge portion, the two portions obviously have different curvatures. As can be seen from FIGS. 25A and 25B, adopting such wiring manner, the wiring of the plurality of drive lines is not provided in the first edge portion that needs to implement containing the narrow frame of the second display unit correspondingly, the corresponding drive lines, $30_1$, $30_2$, $30_3$, $30_{n-2}$, $30_{n-1}$, $30_n$, are provided in group in the second edge portion that does not need to implement the narrow frame, so that the wiring can easily adapt to the frame shape according to different requirements. More specifically, for example, when the second display unit as shown in FIGS. 25A and 25B is applied to an electronic apparatus like a smart watch, an edge where the dial of the smart watch is connected with the strap is the second edge portion that does not need to implement the narrow frame, the edge where the dial of the smart watch is not connected with the strap is the first edge portion. In the example shown in FIGS. 25A and 25B, one of the upper edge portion and the lower edge portion is selected as the portion to arrange the wiring group. As can be readily appreciated, the present application is not limited thereto, it is possible to select one of the left edge portion and the right edge portion as the portion to arrange the wiring group.

In the above, an electronic apparatus and the display method according to the embodiments of the present application are described with reference to FIGS. 1 to 25B. The electronic apparatus and the display method according to the embodiments of the present application can provide image or video display with larger size and higher resolution without being restricted by size of the wearable electronic apparatus itself, like a smart watch, and meanwhile adaptively provide content that the user desires to view when the viewer is at a different viewing distance, thereby enhance associated user experience.

It should be noted that, in the specification, the terms "comprise", "include" and any other variations thereof intend to cover nonexclusive inclusion so that the procedure, the method, the product or the equipment comprising a series of elements comprise not only these elements, but also other elements which are not listed explicitly, or also comprise inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processings do not only comprise processings executed chronologically in the order mentioned here, but also comprise processings executed in parallel or individually but not chronologically.

Through the above description of the implementations, a person skilled in the art can clearly understand that the present disclosure may be implemented in a manner of software plus a necessary hardware platform, and the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and comprise several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limitation of the present disclosure.

The invention claimed is:
1. An electronic apparatus, comprising:
a main body comprising a processing unit configured to generate a first image and to execute display control;
a fixing body connected with the main body and configured to fix the electronic apparatus with a position relationship relative to a viewer of the electronic apparatus;
a first display unit provided on the main body and/or the fixing body, and configured to output the first image, wherein the first display unit comprises a first display component configured to display the first image and a first light path converting component configured to perform light path conversion on the light corresponding to the first image as emitted from the first display component to thereby form an amplified virtual image corresponding to the first image;
a second display unit configured to execute display of image and provided within the main body and/or the fixing body, wherein the first display unit and the second display unit are different types of display unit;
a first sensor unit provided on the main body and/or the fixing body and configured to sense a relative position parameter between eyes of the viewer and a first visible area; and a second sensor unit provided on the main body and/or the fixing body, and configured to sense a parameter of distance between eyes of the viewer and the first visible area;

wherein the first display unit comprises the first visible area, when eyes of the viewer are a first distance away from the first visible area, a first image area of the amplified virtual image is perceived by the viewer, and when eyes of the viewer are a second distance away from the first visible area, a second image area of the amplified virtual image is perceived by the viewer, the second image area comprises the first image area, the first distance is larger than the second distance, the first distance is larger than a first distance threshold, and the second distance is smaller than the first distance threshold;

a first content in the first image is displayed in the first image area, wherein the first content is perceived by the viewer when eyes of the viewer are the first distance away from the first visible area, and when it is sensed that the distance changes from the first distance to the second distance, the processing unit generates a second image and controls the first display unit to display the second image, wherein a second content in the second image is displayed in the second image area, the second content is perceived by the viewer when eyes of the viewer have the second distance away from the first visible area, information quantity of the second content of the second image in the second image area is larger than information quantity of the first content of the first image in the first image area, wherein the second display unit comprises a second visible area, and an edge where the first visible area and the second visible area border on each other is a curve.

2. The electronic apparatus according to claim 1, wherein a second content in the first image is displayed in the second image area, the second content is perceived by the viewer when eyes of the viewer are the second distance away from the first visible area, and information quantity of the second content of the first image in second image area is larger than information quantity of the first content of the first image in the first image area.

3. The electronic apparatus according to claim 2, further comprising a second sensor unit provided on the main body and/or the fixing body and configured to sense a parameter of distance between eyes of the viewer and the first visible area, when it is sensed that the distance changes from the second distance to the first distance, the processing unit generates a third image and controls the first display unit to display the third image, a third image area of the image is perceived by the viewer, the third image area comprises a portion of the first image located outside the third image area and within the second image area in the second distance, wherein the first content is perceived by the viewer when eyes of the viewer are the first distance away from the first visible area.

4. The electronic apparatus according to claim 1, wherein the fixing body comprises at least a fixed state in which the fixing body can serve as at least a portion of an annular space or an approximate annular space that satisfies a first predetermined condition, the annular space or the approximate annular space can surround periphery of a columnar body that satisfies a second predetermined condition.

5. The electronic apparatus according to claim 1, wherein when the distance between eyes of the viewer and the first visible area maintains unchanged and the relative position parameter changes, the processing unit generates a first updated image comprising the first content and controls the first display unit to display the first updated image comprising the first content, wherein when a viewing direction that eyes of the viewer view the first visible area changes, the position of the first content in the first updated image changes correspondingly to keep the position to be a gazed position of the eyes of the viewer on the first visible area so that the first content still is perceived by the viewer, without a change of the viewing direction of the eyes of the viewer.

6. The electronic apparatus according to claim 1, wherein an edge of the second visible area of the second display unit is divided into two portions, the edge of the second visible area corresponding to the plurality of first type of drive lines and the plurality of second type of drive lines connected with the single display drive unit is located in a first portion of the two portions, and wherein an edge length of the second visible area corresponding to the first portion is less than 50% of a total edge length of the second visible area.

7. The electronic apparatus as claimed in claim 6, wherein each of the plurality of first type of drive lines is a straight line, and each of the plurality of second type of drive lines is a curve.

8. The electronic apparatus as claimed in claim 6, wherein each of the plurality of first type of drive lines and the plurality of second type of drive lines is a curve.

9. The electronic apparatus as claimed in claim 8, wherein a shape of the curve matches with a shape of the edge of the second visible area.

10. The electronic apparatus as claimed in claim 9, wherein at least a portion of the edge of the second visible area is a curve, and the edge of the second visible area is at least divided into a first edge portion and a second edge portion, the first edge portion and the second edge portion have different curvatures.

11. The electronic apparatus as claimed in any of claim 6, wherein the plurality of first type of drive lines and the plurality of second type of drive lines are divided into at least two groups of drive lines, each group of the at least two groups of drive lines is connected to the single display drive unit.

* * * * *